(12) United States Patent
Bernhardt

(10) Patent No.: US 11,006,635 B2
(45) Date of Patent: May 18, 2021

(54) METHOD FOR PROCESSING A STRAND OF DOUGH AND DOUGH PROCESSING APPARATUS THEREFOR

(71) Applicant: Fritsch Bakery Technologies GmbH & Co. KG, Markt Einersheim (DE)

(72) Inventor: Udo Bernhardt, Iphofen (DE)

(73) Assignee: FRITSCH BAKERY TECHNOLOGIES GMBH & CO. KG, Markt Einersheim (DE)

( * ) Notice: Subject to any disclaimer, the term of this patent is extended or adjusted under 35 U.S.C. 154(b) by 208 days.

(21) Appl. No.: 15/259,718

(22) Filed: Sep. 8, 2016

(65) Prior Publication Data
US 2017/0071217 A1 Mar. 16, 2017

(30) Foreign Application Priority Data

Sep. 10, 2015 (EP) .................................... 15184660

(51) Int. Cl.
*A21C 3/08* (2006.01)
(52) U.S. Cl.
CPC ...................... *A21C 3/08* (2013.01)
(58) Field of Classification Search
CPC ........................................................ A21C 3/08
USPC ......................................................... 425/323
See application file for complete search history.

(56) References Cited

U.S. PATENT DOCUMENTS

| | | | | |
|---|---|---|---|---|
| 6,036,990 | A * | 3/2000 | Shlyakhovsky | A21C 3/08 425/319 |
| 8,173,191 | B2 * | 5/2012 | Bernhardt | A21C 3/08 426/499 |
| 8,876,519 | B2 * | 11/2014 | Bernhardt | A21C 3/08 425/321 |
| 9,101,145 | B2 * | 8/2015 | Bernhardt | A21C 9/088 |
| 9,936,709 | B2 * | 4/2018 | Bernhardt | A21C 3/08 |

(Continued)

FOREIGN PATENT DOCUMENTS

| | | | | |
|---|---|---|---|---|
| DE | 4039793 | A1 * | 7/1991 | ............. A21C 9/088 |
| EP | 2 618 670 | B1 | 7/2013 | |

(Continued)

*Primary Examiner* — Seyed Masoud Malekzadeh
(74) *Attorney, Agent, or Firm* — Brooks Kushman P.C.

(57) ABSTRACT

A method for processing a U-shaped dough strand (100) having a first dough strand end, which can be used as a securing dough strand end (111), and a second dough strand end, which can be used as a looping dough strand end (121), in which the dough strand (100) is looped by means of a processing head (200) having at least two gripping means (201, 202) to form at least one dough strand loop (161, 162, 163) and is positioned by means of a processing table (300) having positioning means (304, 305, 306, 307), and at least one positioning means embodied as a lifting means (307) raises sections of the dough strand (100) to a raised position relative to the processing table (300), and/or at least one positioning means embodied as a table gripper (306) stretches and/or pulls sections of one of the dough strand ends (121). At least one positioning means (308) embodied as a knotting means (308) spreads and/or expands an opening of a dough strand loop (161) and/or guides a dough strand end (121) through the dough strand loop (161), and said dough strand end (121) is secured in place by means of the dough strand loop (161).

10 Claims, 19 Drawing Sheets

(56) References Cited

U.S. PATENT DOCUMENTS

Figure 1C:
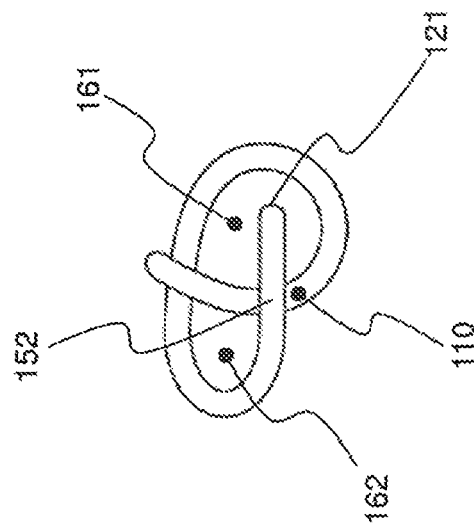

| | | | | |
|---|---|---|---|---|
| 2007/0048423 A1* | 3/2007 | Bernhardt | ................ | A21C 3/08 |
| | | | | 426/499 |
| 2010/0159098 A1* | 6/2010 | Bernhardt | ................ | A21C 3/08 |
| | | | | 426/499 |
| 2013/0059051 A1* | 3/2013 | Bernhardt | ............... | A21C 9/088 |
| | | | | 426/499 |
| 2013/0216672 A1* | 8/2013 | Bernhardt | ................ | A21C 3/08 |
| | | | | 426/499 |

FOREIGN PATENT DOCUMENTS

| | | | | |
|---|---|---|---|---|
| WO | 9820741 A1 | 5/1998 | | |
| WO | 0160164 A1 | 8/2001 | | |
| WO | WO-2005065458 A2 * | 7/2005 | ............... | A21C 3/08 |
| WO | WO-2012038527 A2 * | 3/2012 | ............... | A21C 3/08 |

\* cited by examiner

METHOD FOR PROCESSING A STRAND OF DOUGH AND DOUGH PROCESSING APPARATUS THEREFOR

BACKGROUND OF THE INVENTION

The invention relates to a method for processing a U-shaped dough strand, in which the dough strand is looped by means of a processing head having at least two gripping means to form a dough strand loop and is positioned by means of a processing table having positioning means, wherein at least one positioning means embodied as a lifting means raises sections of the dough strand to a raised position relative to the processing table and/or wherein at least one positioning means embodied as a table gripper stretches and/or pulls sections of one of the dough strand ends. The invention further relates to a dough processing device comprising a processing head and a processing table for processing a U-shaped dough strand, in particular for a method according to the invention. In addition, the invention relates to a positioning means for a processing table of a dough processing device.

Devices and methods for looping dough strands are known, for example, from automated pretzel production. For instance, WO 01/601164 describes a dough processing system which comprises two main components, these being a processing head which is equipped with two program controlled grippers, and a shaping table. A holding element comprising a plurality of positioning means embodied as holding pins is integrated into the shaping table. The holding pins position the dough strand on the shaping table, while the grippers move the dough strand into the desired pretzel shape by means of a looping movement.

An alternative embodiment of a dough processing system and an alternative method are known from EP 2,618,670 B1. For looping a single-strand braid from a U-shaped dough strand, the dough processing system comprises a looping head, which has two gripping means, and a shaping table. The shaping table is embodied as a processing table into which various processing elements are integrated, which, in conjunction with the gripping means of the looping head, form the loops and shapes that are characteristic of a braid.

It is a disadvantage of the described dough processing systems that the looping head, the shaping table or processing table, and the positioning means are embodied in terms of their dimensions and positioning specifically for producing a single dough shape, that is to say, a pretzel or a single-strand braid. Thus the use of a dough processing system for looping a single-strand braid requires a long starting length of the dough strand, for example, which necessarily results in an end product that exceeds the size and weight of a traditional bun and/or a roll. In most cases, the resulting dough products also have a generally loose, non-compact form that is interspersed with openings.

The object of the invention is to avoid the aforementioned disadvantages and to enable new areas of application, in particular the production of a compact dough knot, in the field of mechanized dough processing.

SUMMARY OF THE INVENTION

A method according to the invention is suitable for processing a U-shaped strand of dough having a first dough strand end, which can be used as a securing dough strand end, and a second dough strand end, which can be used as a looping dough strand end, said method being characterized by at least one positioning means embodied as a knotting means, which spreads and/or expands an opening in a dough strand loop and/or guides one of the dough strand ends through the dough strand loop. In other words, either at least one knotting means fulfills one or both of the functions of spreading/expanding the dough strand loop and/or guiding the dough strand end, or at least one knotting means fulfills one of these functions and at least one additional knotting means fulfills the respectively other function. The dough strand end that has been guided through the dough strand loop is secured by means of the dough strand loop, in particular utilizing the elasticity of the dough strand, with the dough strand end having passed through the dough strand loop.

In an optional embodiment, the method according to the invention comprises at least the following steps, particularly in the order listed:

The U-shaped strand of dough is aligned on the processing table such that the first end of the dough strand is offset from the second end of the dough strand, with the first end forming a securing dough strand end and the second end forming a looping dough strand end. Advantageously, a first arm of the U-shaped dough strand, which comprises the securing dough strand end, is shorter than a second arm, which comprises the looping dough strand end.

To loop a first dough strand loop, the securing dough strand end is picked up by a first gripping means of the looping head and is placed on the second arm of the U-shaped dough strand, during which the gripping means preferably executes a rotation of approximately 90°. The securing dough strand end in this case forms a first intersection point with the second arm of the dough strand, thereby forming the first dough strand loop.

To loop a second dough strand loop, the looping dough strand end is picked up by a second gripping means of the looping head and is placed within the first dough strand loop, during which the second gripping means preferably executes a rotation of approximately 180°. The looping dough strand end thereby forms a second intersection point with the first dough strand loop.

To loop a dough strand knot, a section in the region of the first dough strand loop is lifted to a raised position by the lifting means of the processing table so that at least a section of the first dough strand loop is situated at a distance from the processing table. The table gripper of the processing table passes the looping dough strand end below the raised dough strand section, thereby dividing the first dough strand loop into a first dough strand sub-loop, which is adjacent to the first arm, and a second dough strand sub-loop, which is adjacent to the second arm. The looping dough strand end further forms a third intersection point with the first dough strand loop, giving the dough strand a knot-like shape.

To loop a third dough strand loop, the looping dough strand end is picked up by one of the gripping means of the processing table, in particular the first gripping means, during which the first gripping means again executes a rotation of approximately 90°. The looping dough strand end is then positioned within the first dough strand loop, preferably within the second dough strand sub-loop, during which the gripping means executes a rotation of approximately 180°. A dough strand section situated upstream of the looping dough strand end then forms a fourth intersection point with the first dough strand loop.

To secure and/or stabilize the dough strand knot, the looping dough strand end is picked up by the knotting means of the processing table and is passed through the first dough strand loop, particularly in the direction of the processing table. The looping dough strand end is thereby secured, in particular utilizing the elasticity of the dough strand, in a position in which it has passed through the first dough strand loop, preferably through the second dough strand sub-loop.

The method according to the invention is suitable in particular for producing a dough strand knot, however the production of other dough shapes is also conceivable in principle.

In an optional process step, the knotting means is embodied as retractable into the processing table, and is extended out of the processing table during looping of the dough strand knot in such a way that the knotting means is positioned within the first dough strand loop, preferably within the second dough strand sub-loop.

To produce the most compact dough preform possible, the table gripper preferably exerts a tensile force on the looping dough strand end during looping of the dough strand knot, such that the opening(s) of the first and/or the second dough strand loop are reduced in size and/or contracted, corresponding substantially to the tightening or pulling of a knot.

In particular, the opening of the second dough strand loop and an opening of the first dough strand sub-loop are reduced in size and/or contracted, and an opening of the second dough strand sub-loop is contracted and/or reduced in size, such that the second dough strand sub-loop wraps around the knotting means and rests thereon while the knotting means is extended out of the processing table. The knotting means thus determines the size of the opening of the second dough strand sub-loop and fixes said opening in an open position, whereas the openings of the other dough strand loops are narrowed and/or drawn completely closed.

To facilitate pulling of the looping dough strand end through the first dough strand loop, in a preferred process step the knotting means has two or more fingers, which move away from one another or apart during looping of the third dough strand loop, so that the opening of the first dough strand loop, preferably the opening of the second dough strand sub-loop, is spread and/or expanded. Utilizing the elastic property of the dough, the dough strand loop opening can thereby be elastically enlarged.

It is particularly advantageous for the knotting means to be situated within the first dough strand loop, preferably within the second dough strand sub-loop, during the securing and/or stabilization of the dough strand knot, and for the knotting means to have two or more fingers which extend out of the processing table. The two or more fingers move toward one another such that the looping dough strand end is picked up by means of the fingers. More particularly, once the looping dough strand end has been picked up by the two or more fingers, the knotting means is retracted into the processing table, as a result of which the looping dough strand end is guided by the knotting means through the first dough strand loop. The knotting means is then no longer disposed within the first dough strand loop, whereby, by virtue of the elasticity of the dough strand, the opening of the first dough strand loop, preferably the second dough strand sub-loop, is reduced in size and/or contracted around the looping dough strand end. A dough strand end can thereby be secured within a dough strand loop.

Precise guidance during the knotting and/or securing of the looping dough strand end is enabled in particular by the looping dough strand end being transferred and/or delivered by one of the gripping means of the looping head, preferably the first gripping means, to the knotting means.

In an optional process step, an optimized securing of the looping dough strand end is achieved by "pressing on" the fourth intersection point. For this purpose, one of the gripping means of the looping head, more particularly the first gripping means, exerts pressure on the fourth intersection point. Those regions of the dough strand that are located at the fourth intersection point or lie above one another are thereby secured to one another, at least loosely.

For an advantageous implementation of the method, the securing dough strand end is offset by 4-8 cm, preferably 5-7 cm, from the looping dough strand end, and/or the first arm of the U-shaped dough strand, which comprises the securing dough strand end, is 4-8 cm, preferably 5-7 cm, shorter than the second arm of the U-shaped dough strand, which comprises the looping dough strand end. In particular, the U-shaped dough strand is aligned and/or is rotated in the direction of the second arm, for example using an alignment wheel, to such an extent that the securing dough strand end is 4-8 cm, preferably 5-7 cm shorter than the looping dough strand end.

According to a likewise advantageous implementation of the method, at least two gripping means of the processing head, arranged offset from one another, pick up the dough strand ends at approximately the same time, with the offset of the gripping means relative to one another being approximately equivalent to the offset of the dough strand ends relative to one another and/or ranging from 4-8 cm, preferably 5-7 cm. In particular, the gripping means and the processing head itself are each mounted so as to be movable along a circular path within a horizontal plane, and/or so as to each be rotatable around a respective central axis oriented vertically in the direction of the processing table. To be able to pick up two dough strand ends, each of two gripping fingers of a gripping means are adjusted in an initial position such that the gripping fingers are arranged on both sides of the respective dough strand end and are aligned in a plane perpendicular thereto. For picking up two dough strand ends aligned offset from one another, it is thus advantageous for the gripping means to likewise be arranged offset from one another in their respective initial positions. Simply rotating the processing head or the gripping means, without said offset, in order to align the gripping fingers in the region of the offset dough strand ends would result in an oblique and/or imprecise initial position of the gripping fingers with respect to the dough strand end to be picked up.

In an optional process step, the secured dough knot preform is subjected to pressure on both sides and/or is compacted by means of a compacting station. The compacting station particularly comprises at least two approximately mutually parallel, preferably resilient engaging surfaces for exerting at least approximately uniform pressure on both sides of the dough knot preform. The application of pressure results in a compaction and additional fixation of the dough knot preform, so that even after the baking process, the preform will retain its compact, bun-like shape, without the dough strand ends becoming separated and/or openings forming within the preform.

A dough processing device which is suitable for carrying out the described method comprises a processing head having two or more gripping means, and a processing table having at least one lifting means and/or at least one table gripper. In particular, the processing table has additional conveyor belts, embodied for conveying and/or guiding a strand of dough in a direction of conveyance. Such a dough processing device is characterized by at least one positioning means, embodied as a knotting means, which is suitable for spreading and/or expanding an opening of a dough strand loop and/or for guiding one of the dough strand ends through the dough strand loop, so that the dough strand end can be secured in position once it has passed through the dough strand loop. Therefore, either at least a single knotting means is suitable for performing one or both of the functions, or at least two different knotting means are each suitable for performing one of the functions.

The dough processing device is suitable in particular for producing a dough strand knot, however the production of other dough shapes is also conceivable in principle.

In an advantageous embodiment, two or more fingers which are a part of the knotting means project out of the processing table of the dough processing device. In particular, the two or more fingers are embodied to be movable toward and away from one another, therefore the distance between the fingers is variable.

For the dough processing device, it is advantageous for the knotting means to be embodied as a spreading gripper, in particular for spreading and/or expanding a dough strand loop and for guiding one of the dough strand ends through the dough strand loop. In this optional embodiment, the knotting means comprises two or more spreading fingers which are embodied as movable toward one another and away from one another, so that the distance between the fingers is variable. The knotting means or at least the spreading fingers of the knotting means are embodied to be retracted into the processing table and extended out of the processing table.

A table gripper, which can be opened and closed for the purpose of pulling a dough strand end in the pulling direction and/or parallel to the pulling direction, results in an advantageous embodiment of the dough processing device. Further advantageously, the table gripper has a shaping edge and/or a shaping channel for forming a dough nib on one of the dough strand ends. More particularly, the table gripper comprises two shaping fingers, embodied for gripping a dough strand end and for pulling the dough strand end in and/or opposite the direction of conveyance. The shaping fingers are preferably arranged one in front of the other with respect to the pulling or conveying direction and are preferably movable toward one another and away from one another, so that the distance between the shaping fingers is variable. At least one shaping finger has a shaping edge and/or shaping channel, which is suitable for forming a dough nib on the dough strand end. For this purpose the dough strand end is folded and/or bent over the shaping edge and/or is received by the shaping channel. In principle, the embodiment of a shaping edge and/or a shaping channel is not limited to the shaping fingers of a table gripper, and may be applied to any gripping means of a processing table, in particular a knotting means.

In an optional embodiment, the dough processing device comprises a compacting station for compacting the dough knot preform and/or for exerting pressure on both sides of the dough knot preform. In particular, the compacting station comprises at least two approximately mutually parallel engaging surfaces, which are preferably embodied as resilient for the purpose of exerting an at least approximately uniform pressure on both sides of the dough knot preform. By using a compacting station, the scrap that is produced in the production of dough strand knot preforms can be minimized.

In an optional, space-saving embodiment of the dough processing device, the two or more gripping means of the processing head each comprise a plunger and two gripping fingers, the plunger being situated between the gripping fingers and/or within the same plane as the gripping fingers. For example, plunger and gripping fingers may be arranged in such a way that the gripping fingers can be moved toward one another and away from one another within a common plane, and the plunger can be moved within the same plane, rotated approximately 90° relative to the direction of movement of the gripping fingers.

To produce dough shapes, in particular dough strand knots, in a continuous process, the processing table of the dough processing device has a plurality of substantially mutually parallel conveyor belts, arranged adjacent to one another. The conveyor belts are embodied for conveying the strand of dough in a conveying direction and in particular for transporting the unlooped strand of dough up to, or for transporting the looped dough knot preform away from the gripping means of the processing head and the positioning means of the processing table. For this purpose, at least part of the positioning means is located between adjacent conveyor belts. Advantageously, at least one additional positioning means is embodied as a conveyor strip, the conveyor strip being situated in each case between adjacent conveyor belts and beginning or ending at one of the other positioning means, or another positioning means being situated at the end or at the beginning of the conveyor strip. The conveyor strip is thus embodied as shorter than the conveyor belts, so that a recess is formed at the end or at the beginning of the conveyor strip within the processing table. The recess is suitable in particular for accommodating one or more positioning means, as this enables a particularly uniform conveyance of the strand of dough up to or away from the corresponding positioning means.

A positioning means embodied as a knotting means is characterized by at least one of the processing functions described below, and is suitable for a processing table which has a plurality of different processing functions for producing at least one dough strand loop from a strand of dough. In particular, the positioning means is suitable for a processing table of a dough processing device as described above and for a method for processing a strand of dough as described above. In a first processing function, the positioning means is suitable for spreading and/or expanding a dough strand loop and for this purpose can be moved substantially along a table plane of the processing table. In a second processing function, the positioning means is suitable for guiding a dough strand end through a dough strand loop, and for this purpose can be moved substantially perpendicularly to a table plane of the processing table. At least one dough strand loop preferably lies on the table plane of the processing table, and the positioning means can be integrated into the processing table in such a way that the positioning means can be positioned within an opening in the dough strand loop.

In an optional embodiment of the positioning means, said positioning means can be integrated as a spreading gripper into the processing table in such a way that two or more spreading fingers are arranged projecting outward from the processing table, preferably within a dough strand loop, and can be moved toward one another and away from one another substantially along a table plane of the processing table. The opening of the dough strand loop can be enlarged by opening and closing the spreading fingers, and can be reduced in size by utilizing the elasticity of the dough strand loop. Additionally or alternatively, the positioning means embodied as a spreading gripper can be integrated into the processing table in such a way that the positioning means, in particular two or more spreading fingers of the positioning means, can be retracted into the processing table and extended out of the processing table.

Figure 1B:
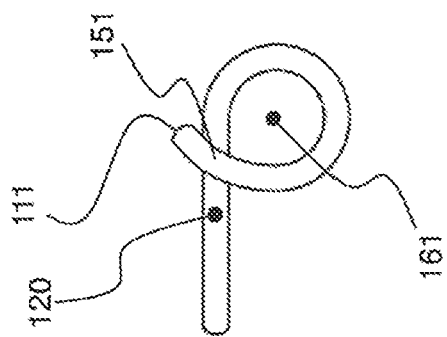
Figure 1A:
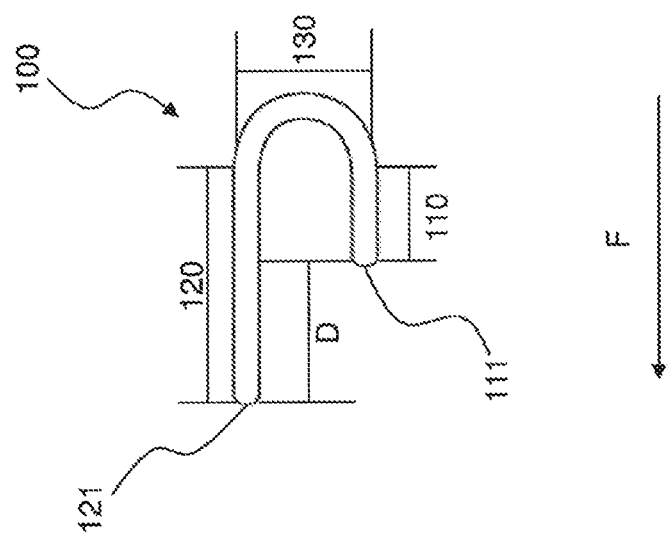
Figure 1D:
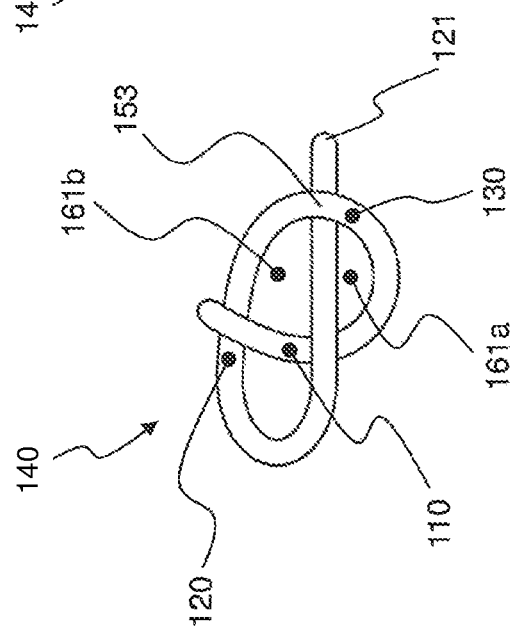
Figure 1E:
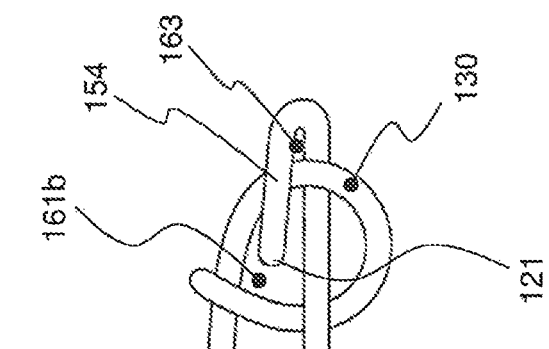
Figure 1F:
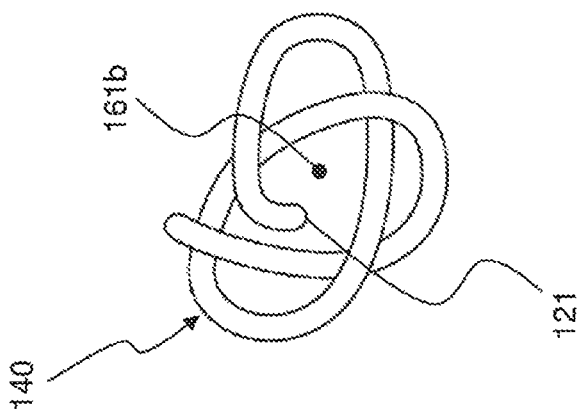
Figure 2:
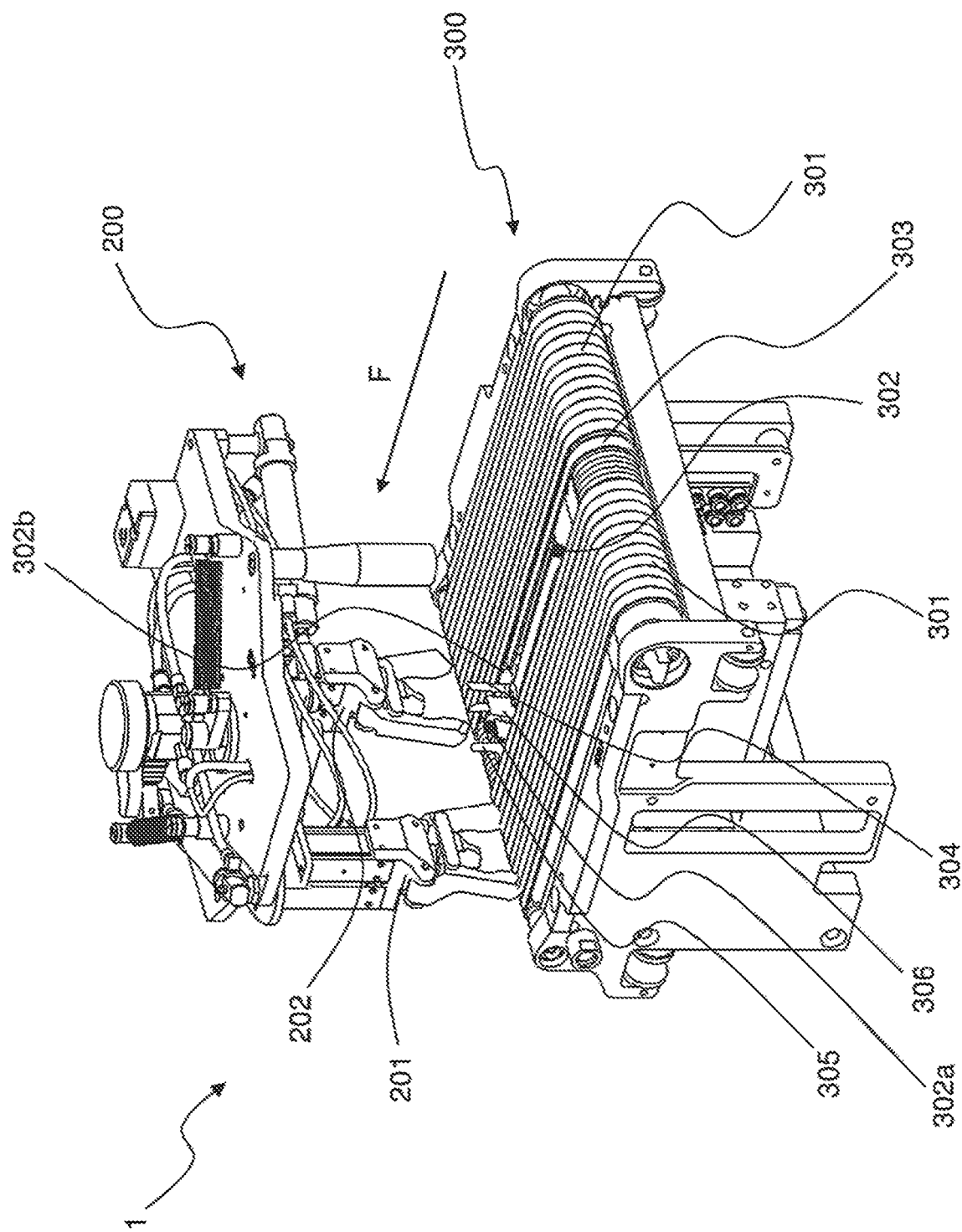
Figure 3:
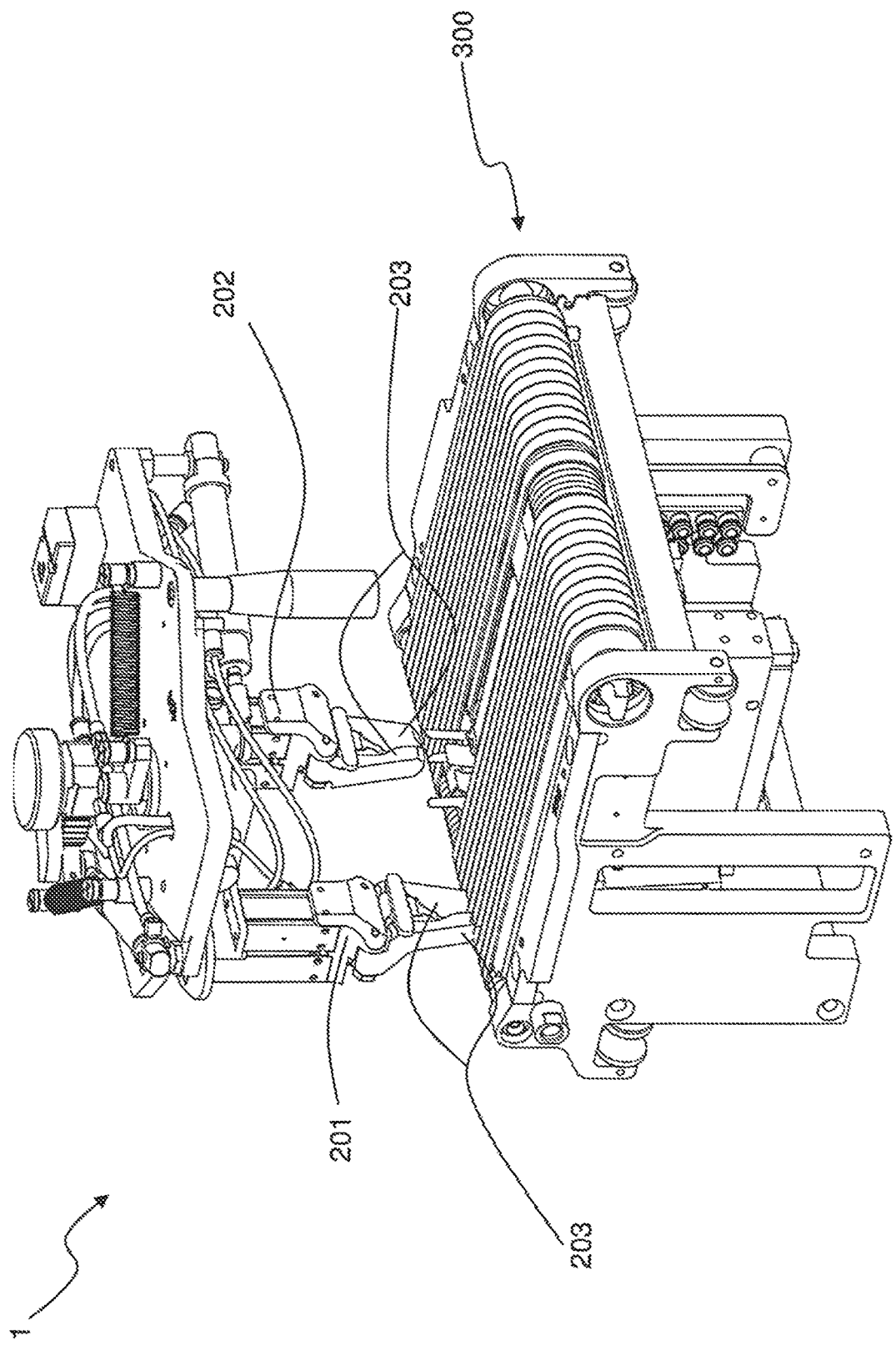
Figure 4:
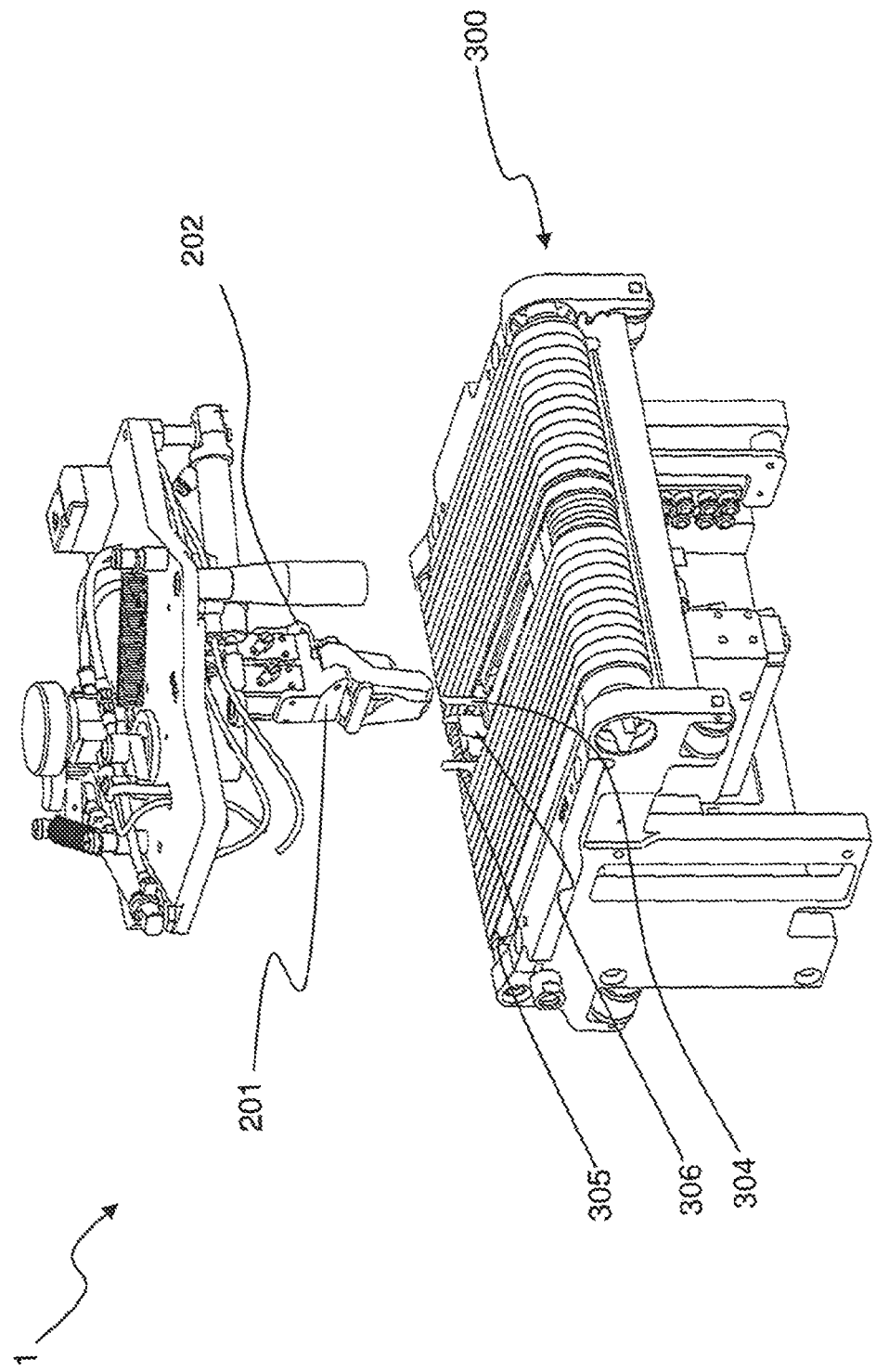
Figure 5:
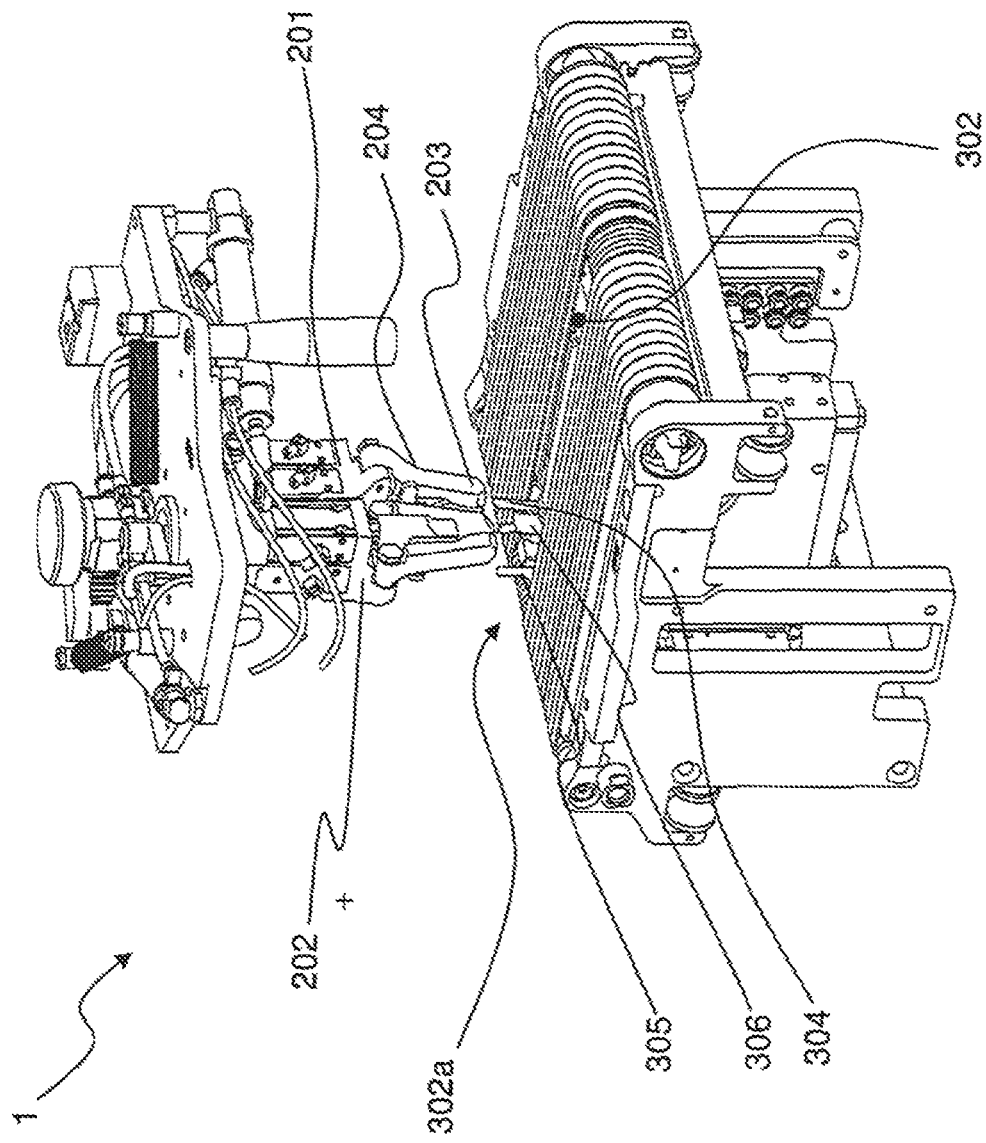
Figure 6:
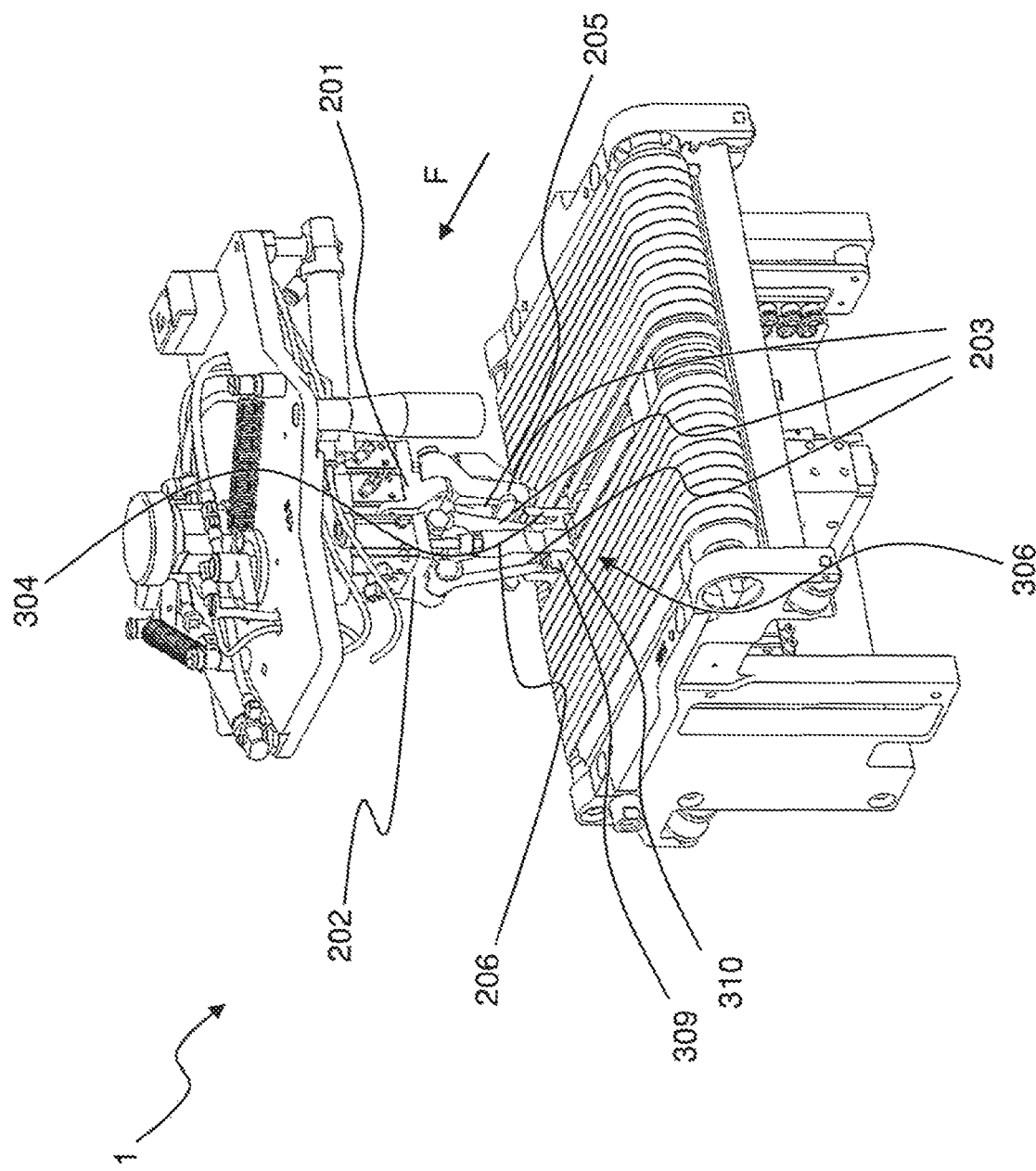
Figure 7:
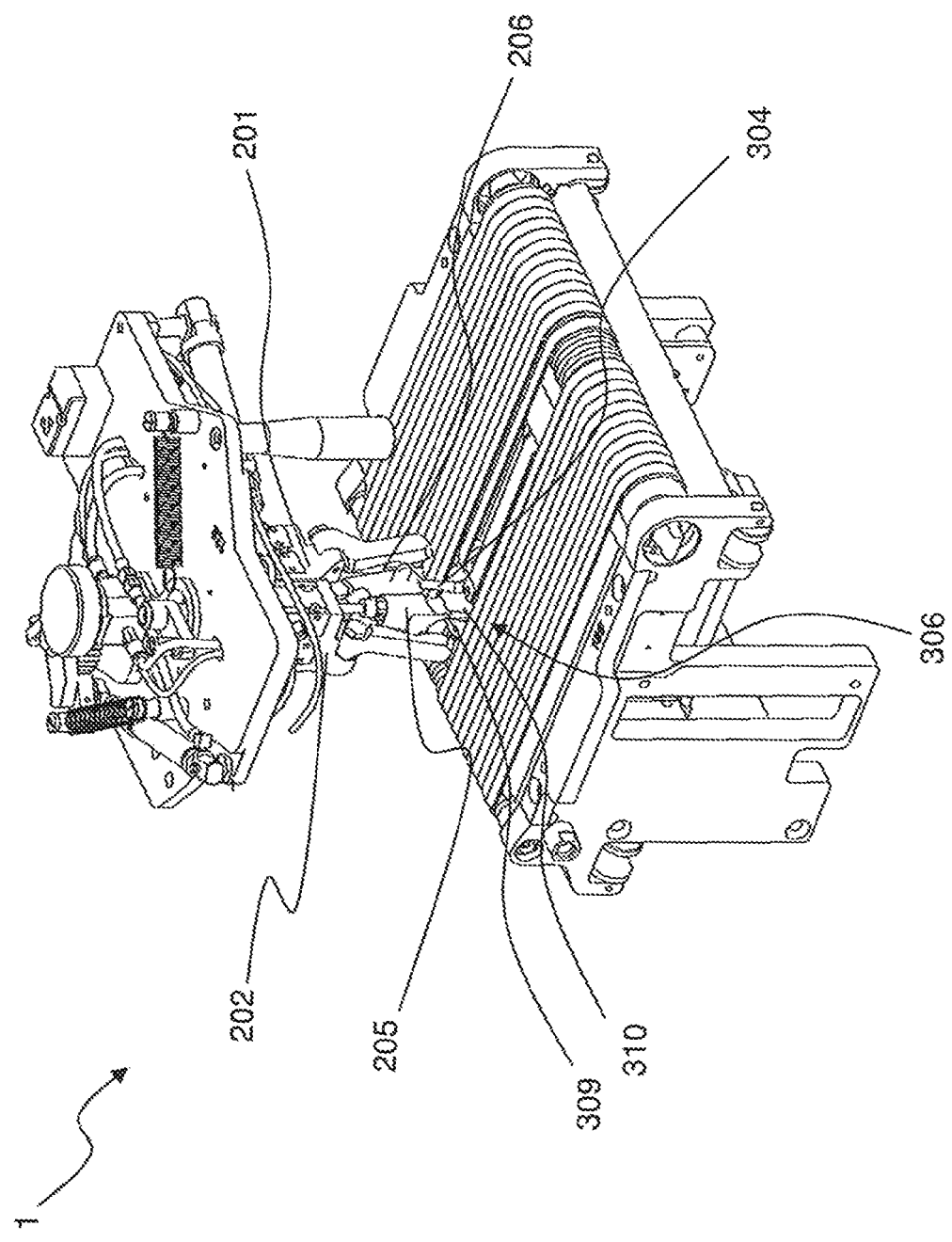
Figure 8:
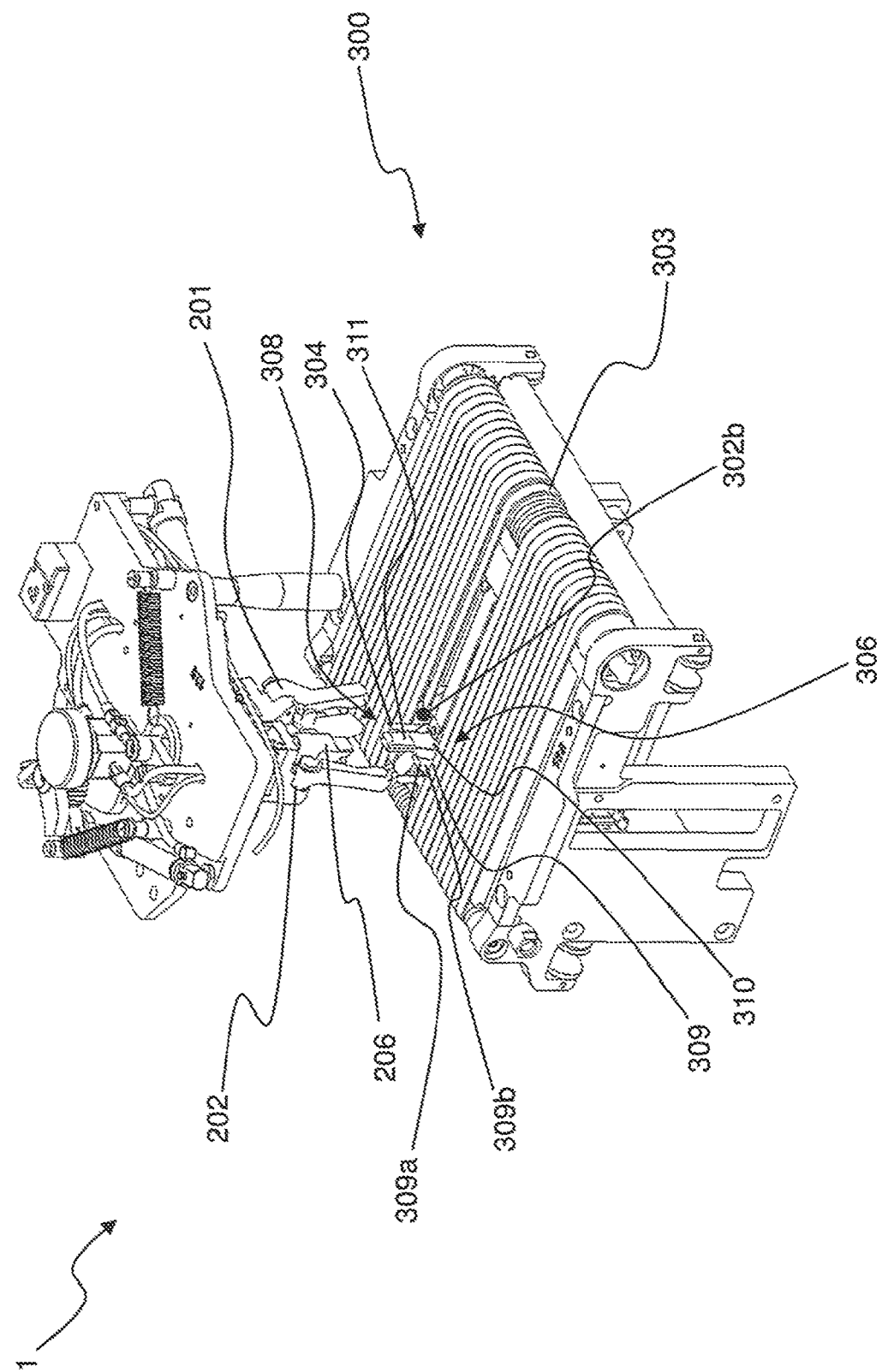
Figure 9:
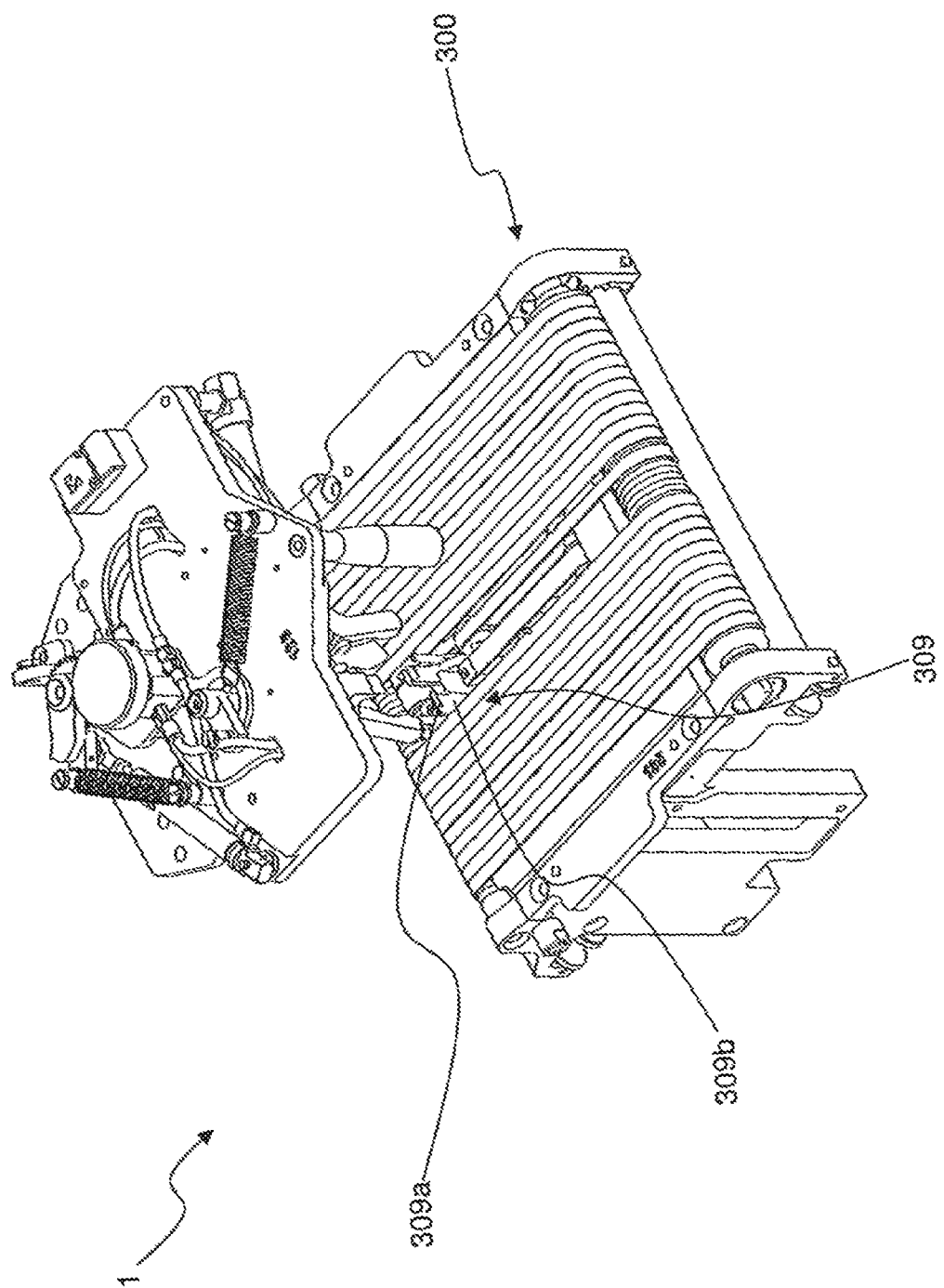
Figure 10:
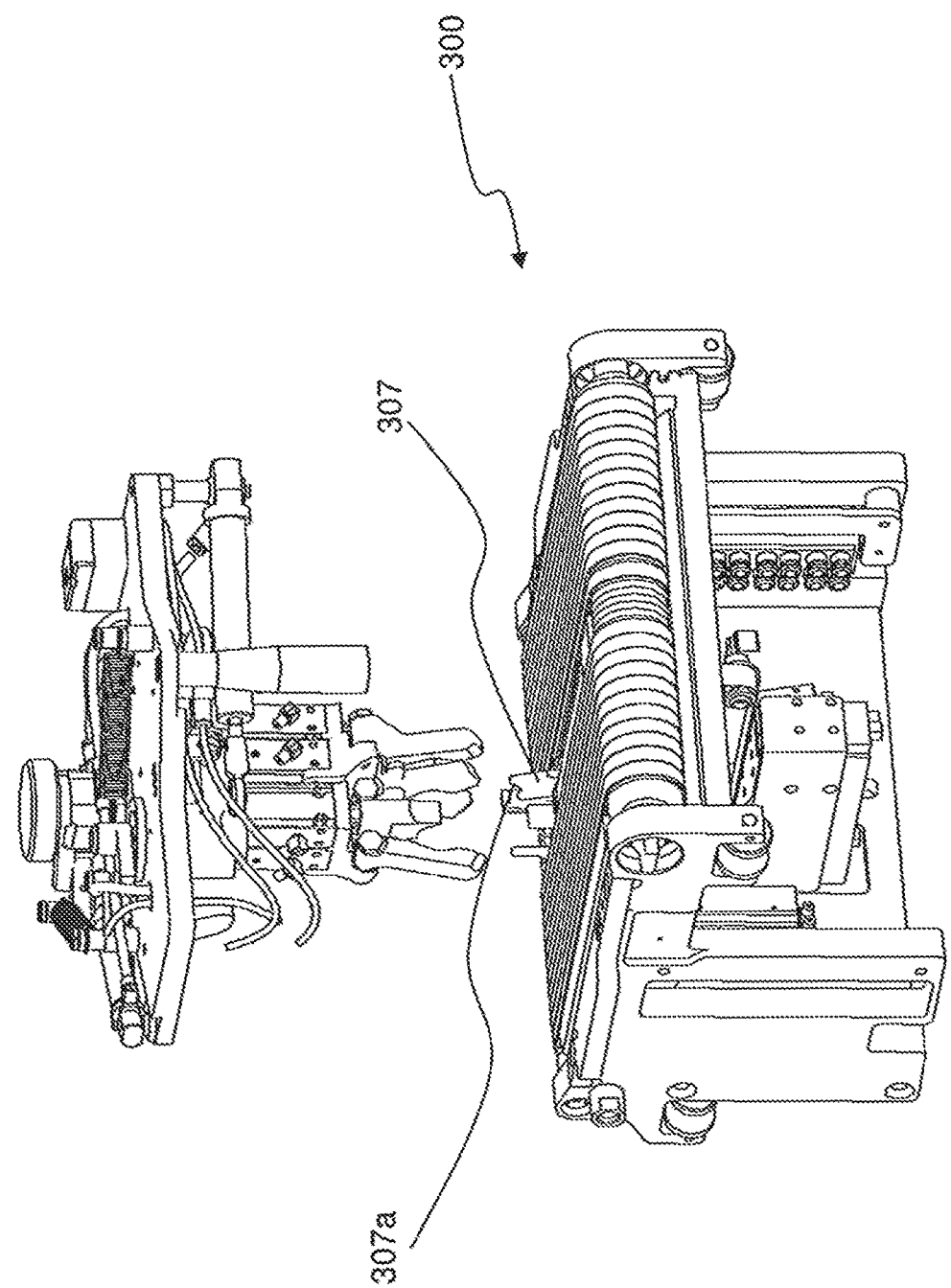
Figure 11:
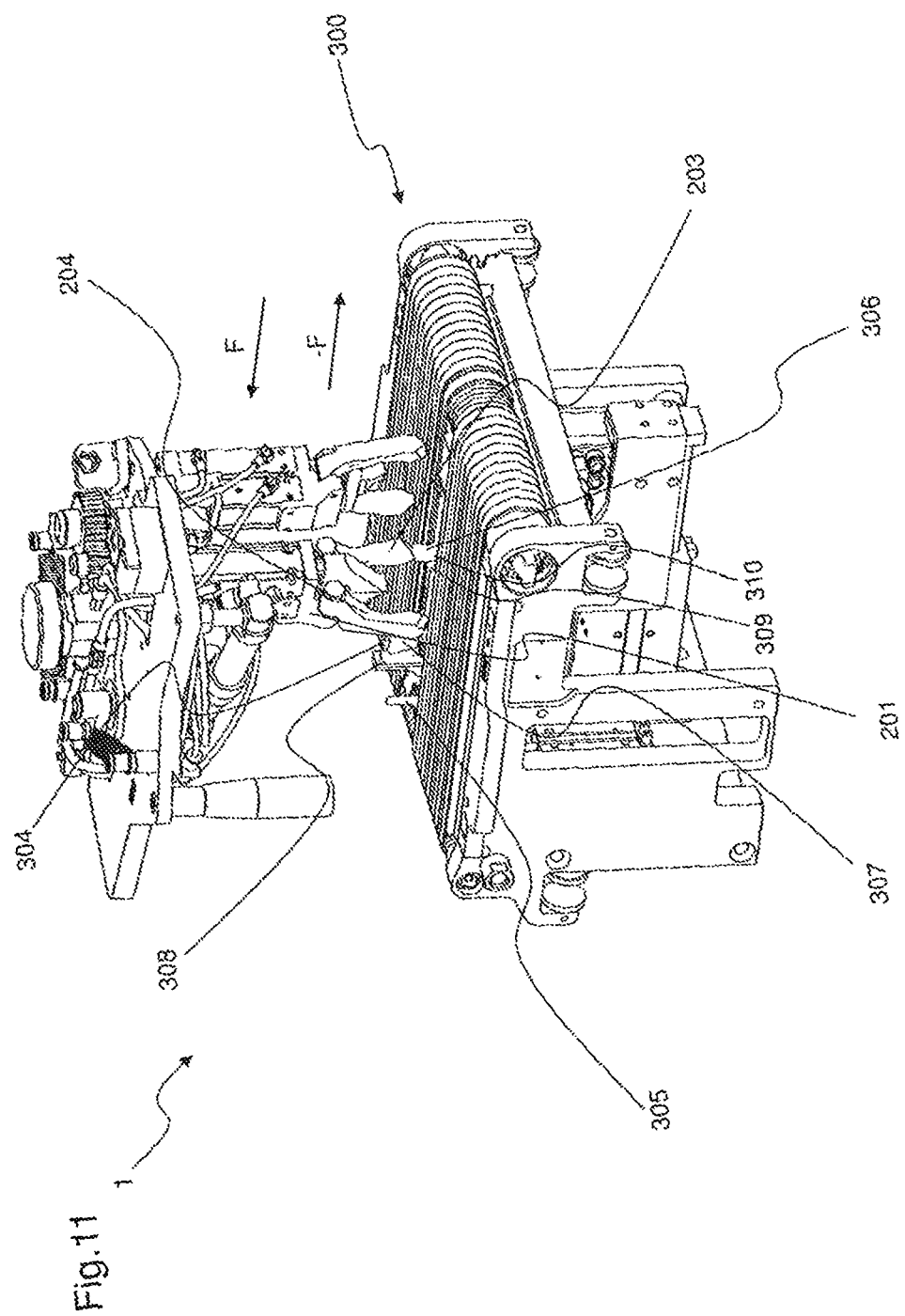
Figure 12:
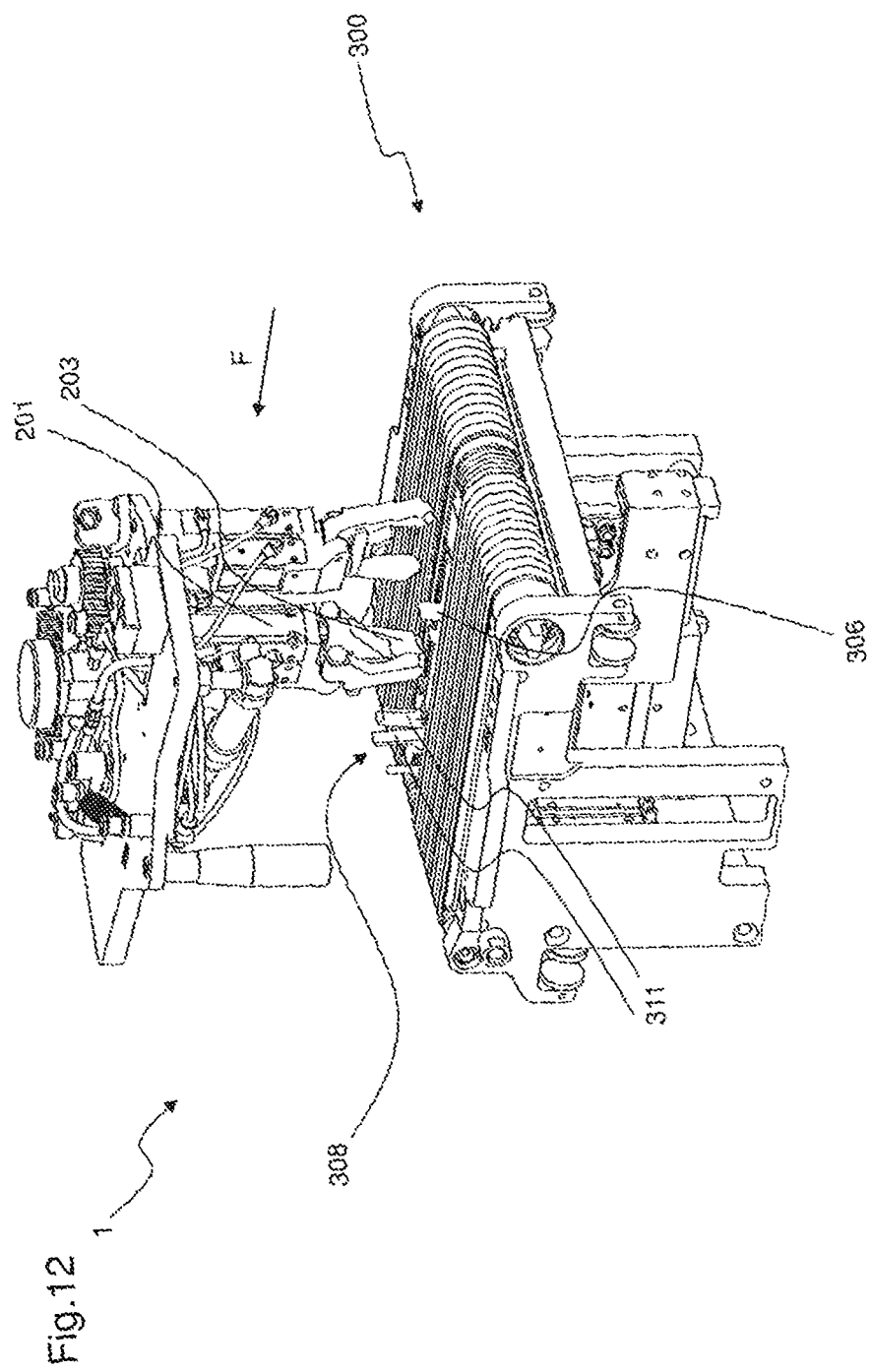
Figure 13:
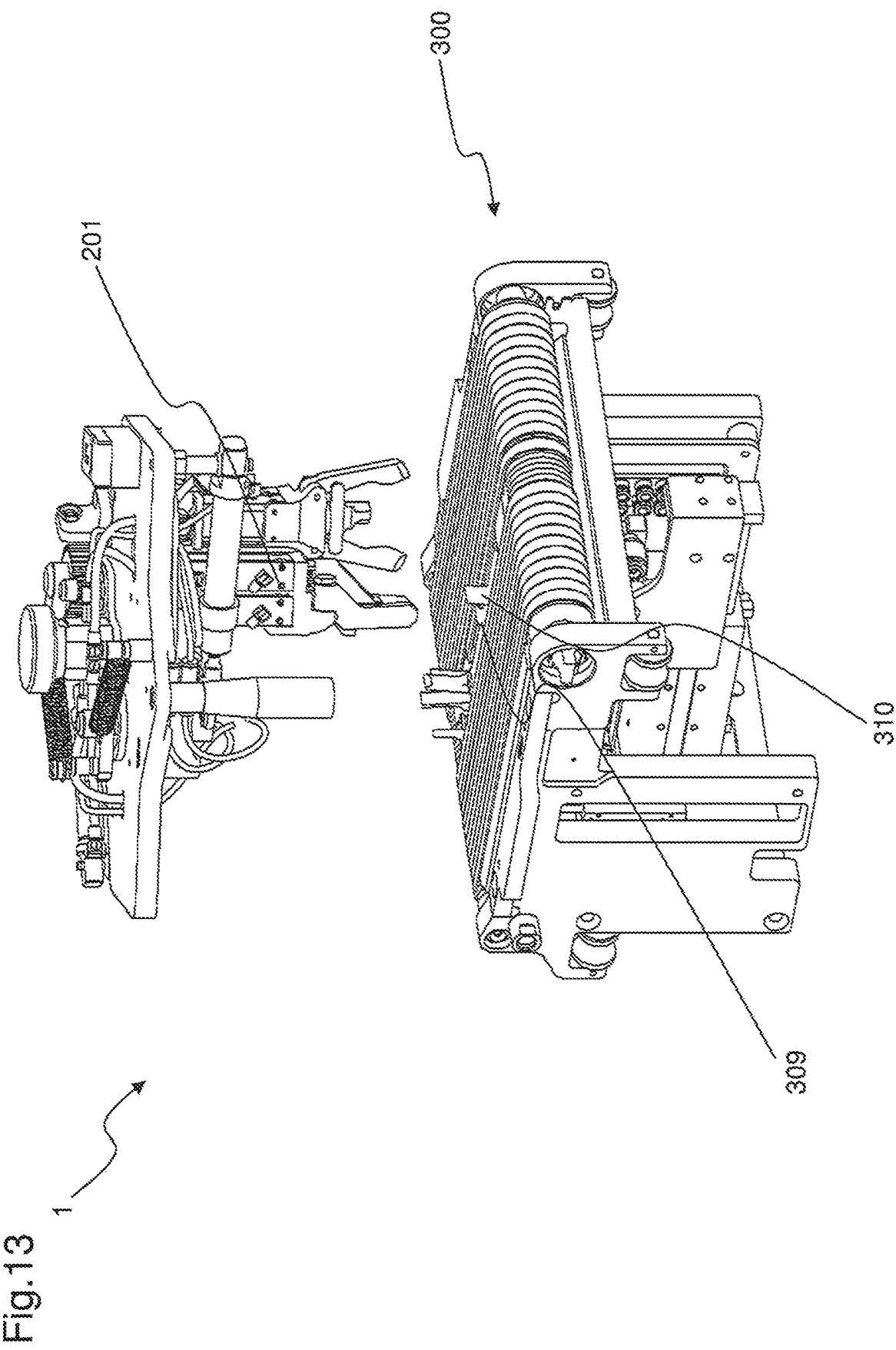
Figure 14:
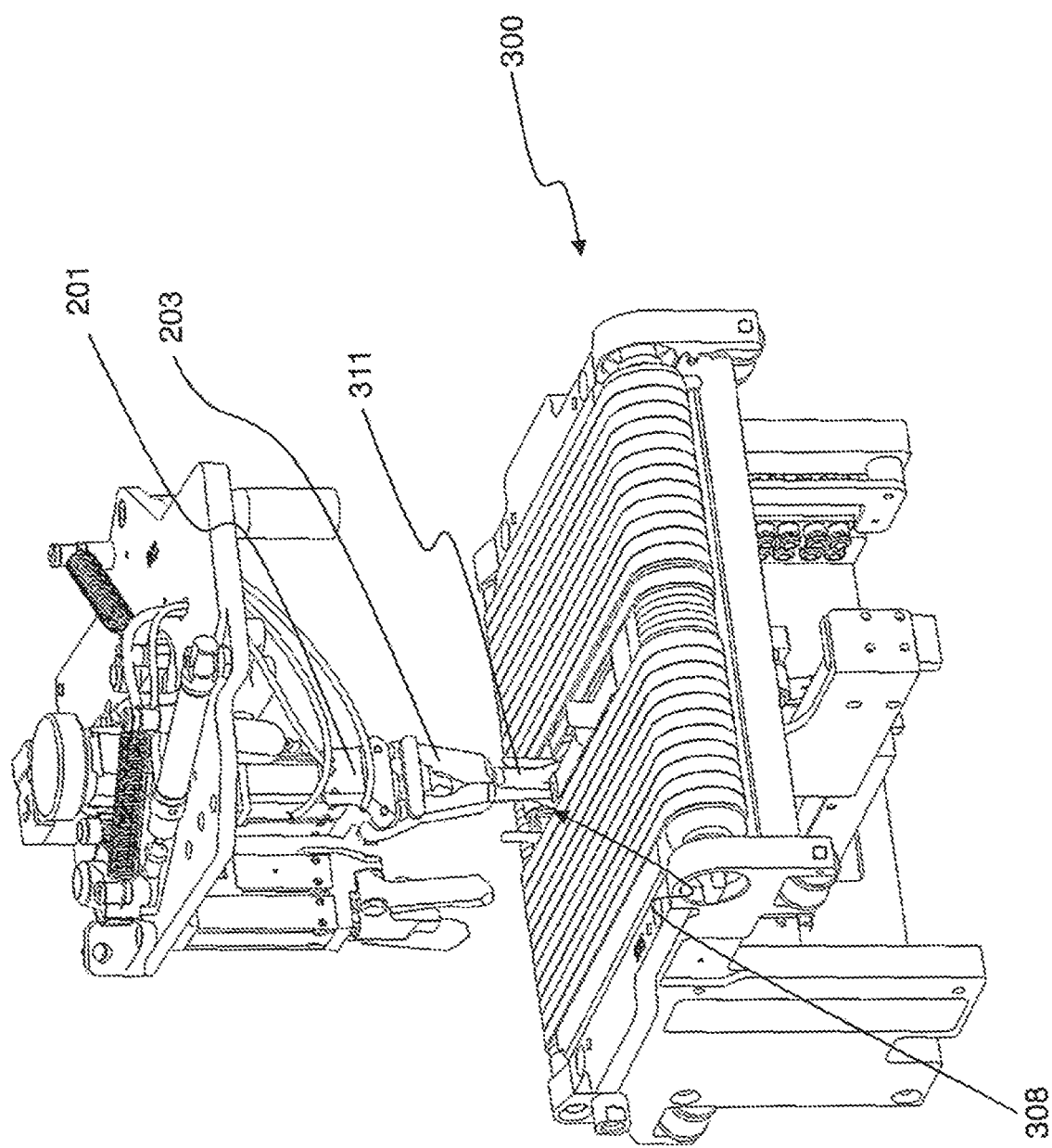
Figure 15:
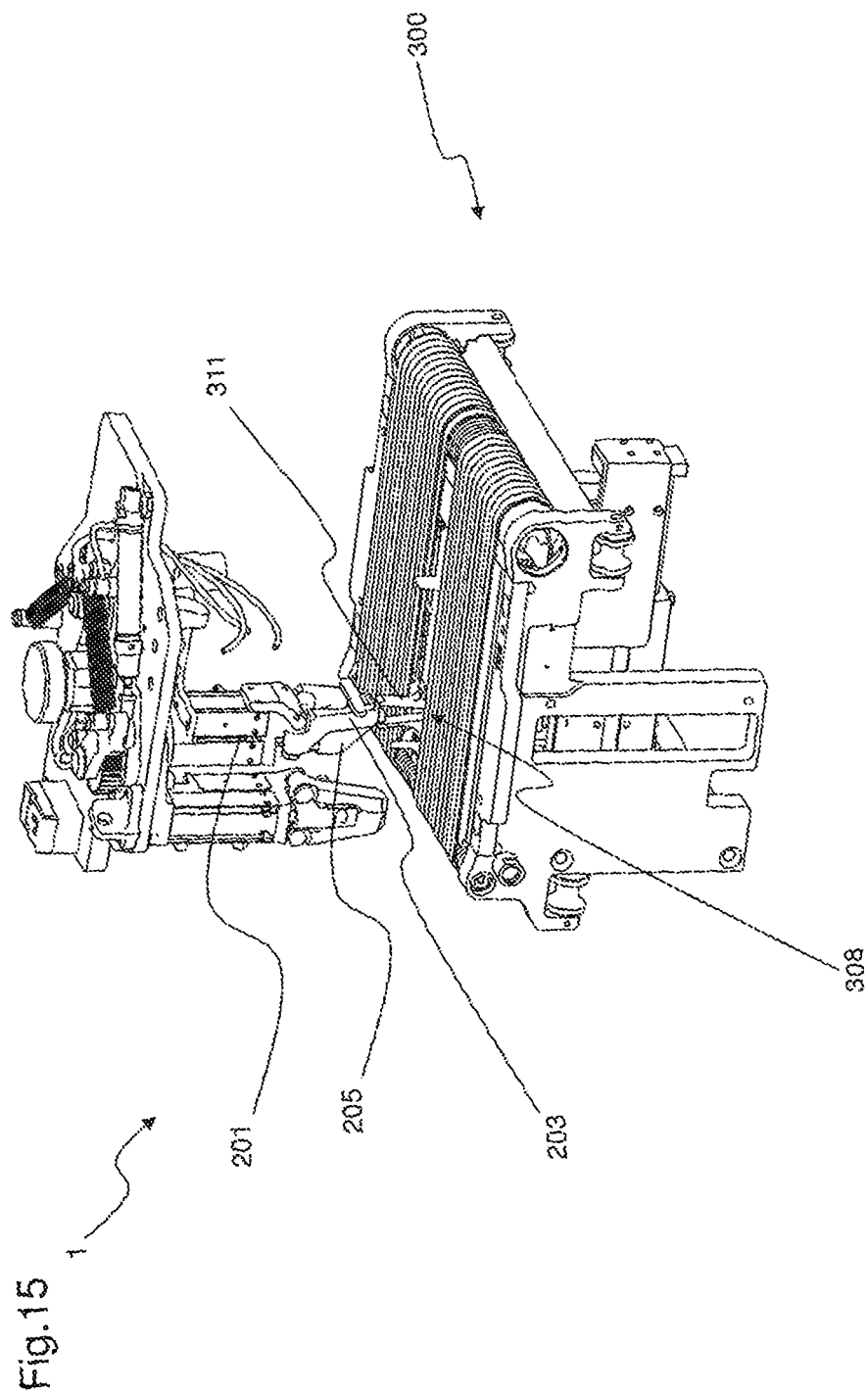
Figure 16:
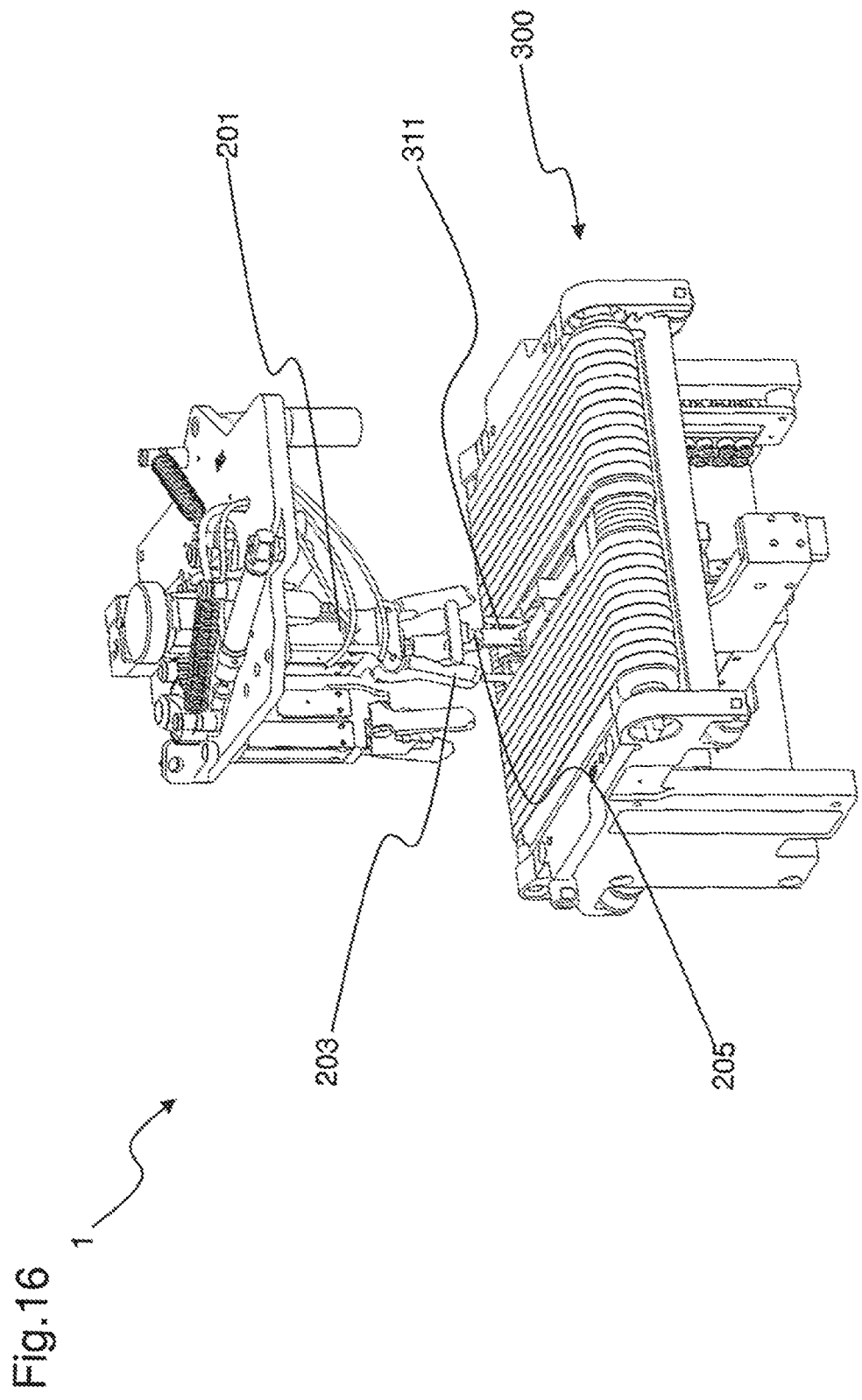
Figure 17:
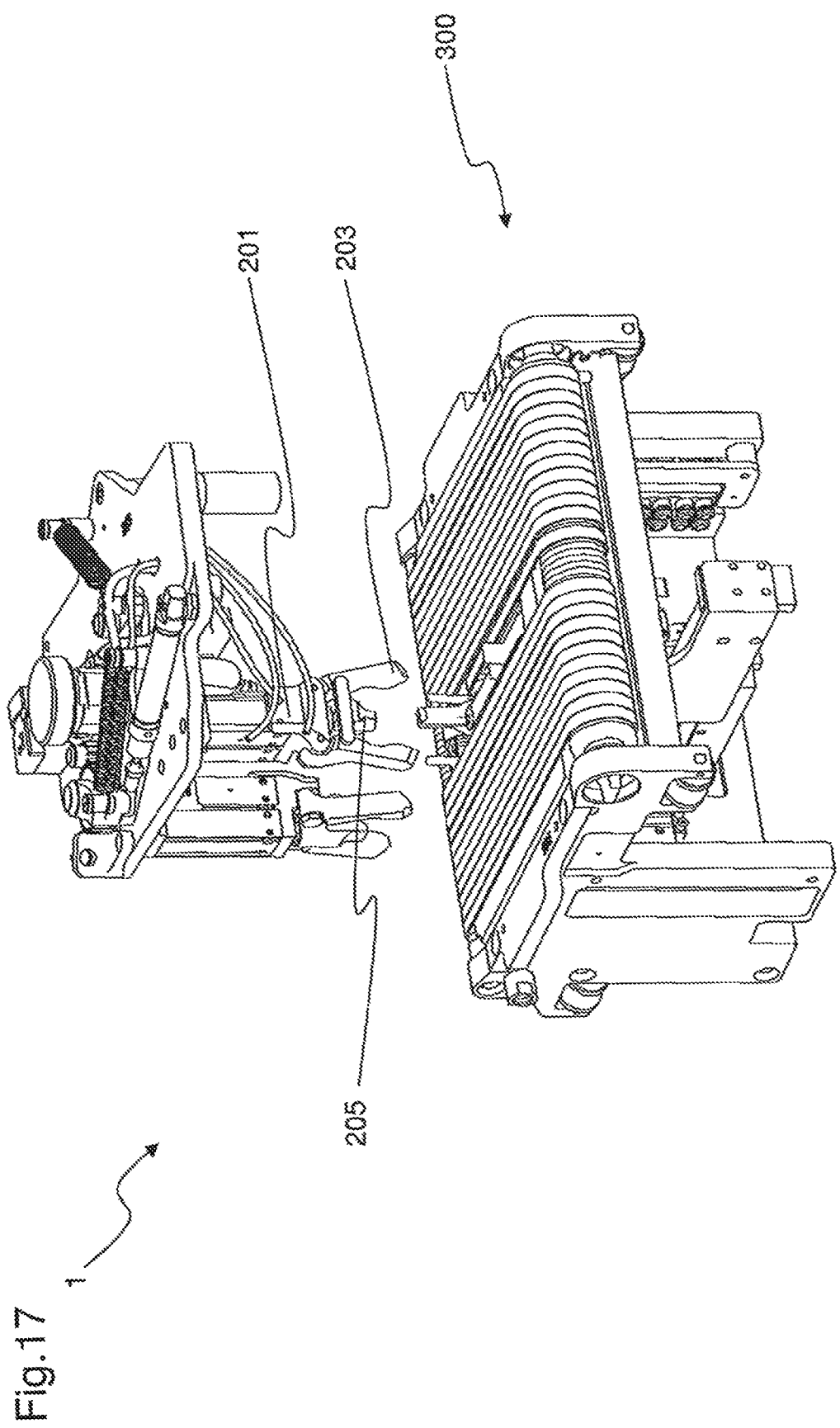
Figure 18:
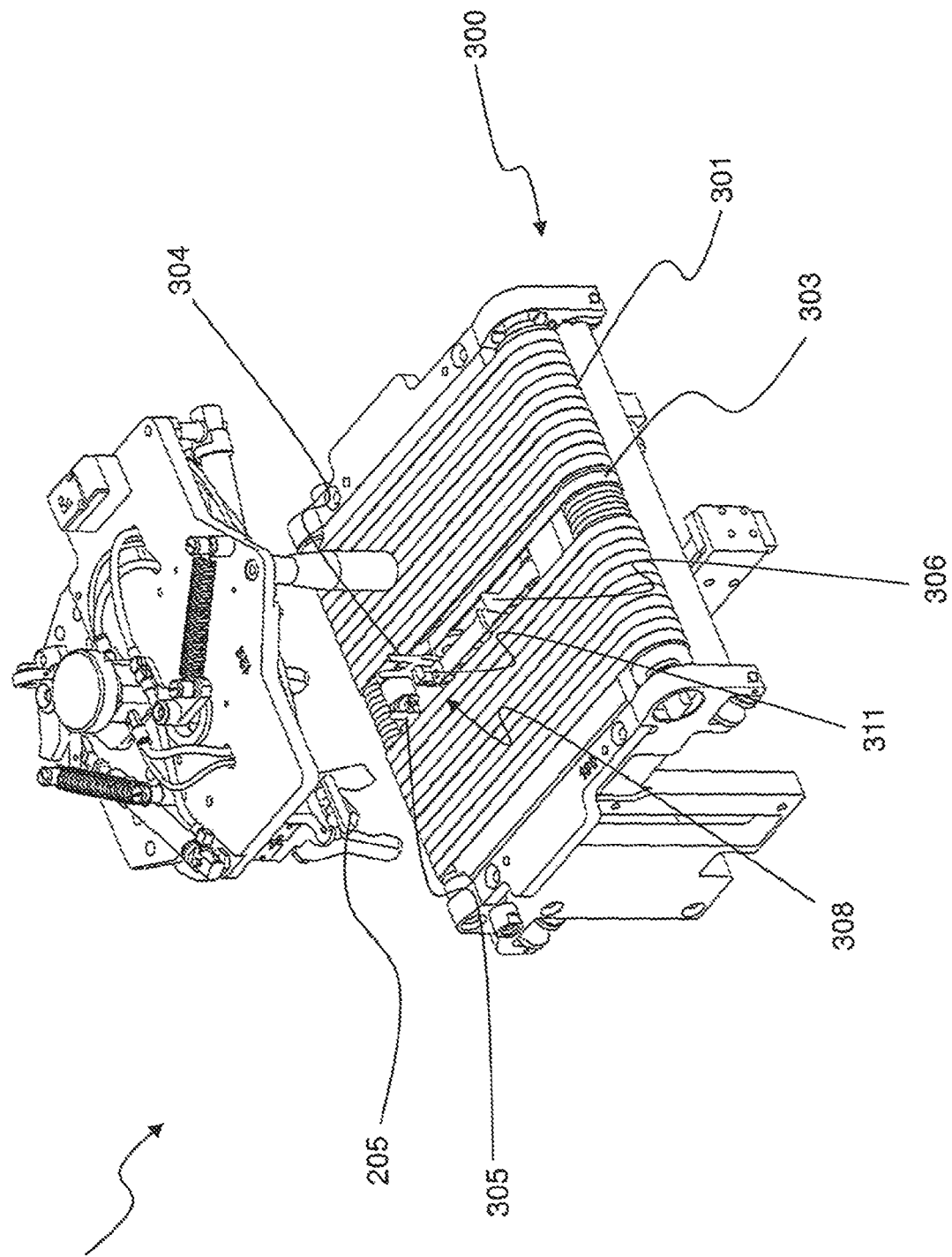

Further details, features, combinations of (sub-)features, advantages and effects based on the invention are apparent from the following description of a preferred embodiment of the invention and from the drawings. The drawings show:

FIG. 1A a first position of a dough strand in a schematic illustration of a looping process for producing a dough strand knot, FIG. 1B a second position of a dough strand in a schematic illustration of a looping process for producing a dough strand knot, FIG. 1C a third position of a schematic illustration of a dough strand in a looping process for producing a dough strand knot, FIG. 1D a fourth position of a schematic illustration of a dough strand in a looping process for producing a dough strand knot, FIG. 1E a fifth position of a schematic illustration of a dough strand in a looping process for producing a dough strand knot, FIG. 1F a sixth position of a dough strand in a schematic illustration of a looping process for producing a dough strand knot, FIG. 2 a perspective view of a dough processing device having a processing head and a processing table, in an initial or starting position, FIGS. 3-18 each a perspective representation of the dough processing device of FIG. 2 in various positions for carrying out a method for producing a dough knot, FIG. 3 a perspective view of a dough processing device in a second position with a first and a second gripping means in a closed position, FIG. 4 a perspective view of a dough processing device in a third position with the first gripping means in a horizontally rotated position, FIG. 5 a perspective view of a dough processing device in a fourth position with the second gripping means in a horizontally rotated position, FIG. 6 a perspective view of a dough processing device in a fifth position, that is to say a releasing position, with the gripping means opening and plungers executing a vertical movement, FIG. 7 a perspective view of a dough processing device in a sixth position, that is to say a discharging position, with the gripping means opened and the plungers vertically moved to a discharging position, FIG. 8 a perspective view of a dough processing device in a seventh position, with a table gripper shown in a closed position, FIG. 9 shows the position of the dough processing device that is shown in FIG. 8 from a perspective plan view, FIG. 10 a perspective side view of a dough processing device in an eighth position, with a lifting means, FIG. 11 a perspective view of a dough processing device in a ninth position, with the table gripper displaced along a conveying direction F, FIG. 12 a perspective view of a dough processing device in a tenth position, with gripping fingers of the first gripping means in a closed position, FIG. 13 a perspective view of a dough processing device in an eleventh position, with the first gripping means in a vertically raised position, FIG. 14 a perspective view of a dough processing device in a twelfth position, with the first gripping means located above a knotting means, FIG. 15 a perspective view of a dough processing device in a thirteenth position, with the plunger of the first gripping means in a lowered position, FIG. 16 a perspective view of a dough processing device in a fourteenth position, with spreading fingers of the knotting means in a closed position, FIG. 17 a perspective view of a dough processing device in a fifteenth position, with the plunger in its initial position, FIG. 18 a perspective view of a dough processing device in a final position, with the knotting means located in a vertically lowered position.

DETAILED DESCRIPTION

According to FIG. 1A, a U-shaped dough strand 100 has a first arm 110 with a securing dough strand end 111, a second arm 120 with a looping dough strand end 121 and an arcuate section 130 located therebetween. For the mechanized production of a dough strand knot 140, dough strand 100 is aligned with arms 110, 120 pointing in a conveying direction F and extending parallel to one another, the second arm 120 extending beyond the first arm 110 by the distance D, and the looping dough strand end 121 situated downstream of the securing dough strand end 111 in conveying direction F.

In FIG. 1B, securing dough strand end 111 is bent approximately 90° and positioned on the second arm 120, forming a first intersection point 151 between securing dough strand end 111 and second arm 120, and forming a first dough strand loop 161. Securing dough strand end 111 remains in the position shown until the looping process is complete. As is clear from FIG. 1C, a second dough strand loop 162 is formed by bending looping dough strand end 121 approximately 180° and placing it within the first dough strand loop 161. At a resulting, second intersection point 152, looping dough strand end 121 extends above first arm 110, which is bent at approximately a right angle thereto. A dough strand knot 140 is shown in FIG. 1D. To produce said knot, looping dough strand end 121 is guided below arcuate section 130, with which it forms a third intersection point 153. At the same time, looping dough strand end 121 divides first dough strand loop 161 into a first dough strand sub-loop 161a, which is allocated to first arm 110, and a second dough strand sub-loop 161b, which is allocated to second arm 120.

According to FIG. 1E, a third dough strand loop 163 is formed by bending looping dough strand end 121 again approximately 180° and placing it within the first dough strand loop 161, more precisely within the second dough strand sub-loop 161b. At a resulting fourth intersection point 154, looping dough strand end 121 extends above arcuate section 130. To secure dough strand knot 140 in position, as shown in FIG. 1F, looping dough strand end 121 is guided through second dough strand sub-loop 161b, perpendicular to the plane of the dough strand knot. FIGS. 1A-1F illustrate the process for looping a dough strand knot 140 only schematically, with greatly enlarged dough strand loops 161, 162, 163. In the automated, mechanized production of dough strand knot preforms, openings in the dough strand knot preform should be avoided if at all possible.

A perspective view of the initial position or starting position of dough processing device 1 is shown in FIG. 2. Dough processing device 1 is suitable for producing a secured dough strand knot preform 140, according to FIG. 1F, from a dough strand 100 aligned in a U-shape, according to FIG. 1A. The positions and functions of dough processing device 1 that are required to carry out the looping process (see FIGS. 1A-1F) are shown in FIGS. 3-18, but without dough strand 100 being included.

Dough processing device 1 is a component of a system for carrying out a continuous dough knot production process, and is particularly situated downstream of an aligning station having an aligning wheel for aligning a strand of dough according to FIG. 1A, or upstream of a compacting station for compacting the looped dough knot preform. Dough processing device 1 comprises a processing head 200, located above dough strand 100, and a processing table 300, located below dough strand 100. Processing head 200 is embodied primarily for picking up and looping dough strand ends 111, 121, whereas processing table 300 is additionally suitable for transporting and supporting dough strand 100 in a horizontal conveying direction F and for positioning dough strand 100.

A processing head for a dough processing device and the basic functioning thereof is already known from EP 2,618,670 B1. However, the processing head 200 shown in FIGS. 2-18 has significant differences, which are adapted specifically for producing a dough strand knot 140. For instance, processing head 200 comprises two gripping means 201, 202, arranged adjacent to one another but offset from one another in conveying direction F. A first gripping means 201 is disposed downstream of a second gripping means 202 with respect to conveying direction F, in a region for gripping the securing dough strand end 111, and the second gripping means is disposed in a region for gripping looping dough strand end 121. The offset of gripping means 201, 202 corresponds approximately to the distance D between looping dough strand end 121 and securing dough strand end 111 (see FIG. 1A).

From EP 2,618,670 B1, a processing table for a dough processing device is also known, from which the processing table 300 shown in FIGS. 2-18 differs substantially in terms of the basic functions and devices described below. Processing table 300 comprises a plurality of adjacent conveyor belts 301 arranged parallel to one another, which are operated in a common conveying direction F. A processing area 302 located centrally between the conveyor belts 301 is embodied to accommodate various positioning means 303, 304, 305, 307, 308. Processing area 302 comprises a shortened conveyor strip 303, which extends parallel to the conveyor belts 301 and ends in a rear section 302a of processing area 302. To enable the arcuate section 130 of dough strand 100 to be positioned precisely on positioning means 304, 305, 306, 307, the shortened conveyor strip 303 ends at a recess 302b, which is embodied to accommodate at least positioning means 304, 308. To hold each of the various dough strand loops 161, 162, 163, which are formed during the looping process, in their respective designated positions, or to secure the dough strand ends 111, 121 of the dough strand 100 in place, processing table 300 has a holding fork 304, a holding pin 305 and a table gripper 306, which are situated in the rear section 302a of processing area 302, and which extend outward from processing table 300. Holding fork 304 and holding pin 305 are each vertically movable, and can be retracted into processing table 300 and extended therefrom. Holding pin 305 is located downstream of table gripper 306 with respect to conveying direction F. Holding fork 304 is positioned at approximately the same height as table gripper 306, at the end of conveyor strip 303 within recess 302b.

During the looping process, first the already aligned dough strand 100 (see FIG. 1A) is conveyed in conveying direction F by means of conveyor belts 301 to be picked up by gripping means 201, 202, with securing dough strand end 111 being positioned between two gripping fingers 203 of first gripping means 201, and looping dough strand end 121 being positioned between two gripping fingers 203 of second gripping means 202. The precise positioning of the dough strand ends 111, 121 and/or the time for stopping the conveyor belts is preferably detected with the aid of optical sensors.

In FIG. 3, gripping means 201, 202 of dough processing device 1 are shown in a position in which said means are gripping dough strand ends 111, 121, that is to say, a closed position. Gripping means 201, 202 each comprise two gripping fingers 203, each of which is pivotable about a respective axis, so that gripping fingers 203 can be moved toward one another, or closed, to pick up the dough strand ends 111, 121, and can be moved away from one another, or opened, to release the dough strand ends 111, 121. Gripping means 201, 202 can likewise be moved vertically upward to a position spaced from processing table 300 in order to pick up the dough strand ends 111, 121, or vertically downward toward processing table 300 in order to release the dough strand ends.

As is clear from FIGS. 4 and 5, gripping means 201, 202 can also be pivoted or rotated horizontally. In FIG. 4, the first gripping means 201 is shown in a position rotated 90° from the initial position and in a upwardly moved position, so that the securing dough strand end 111 is positioned above the second arm 120 of the U-shaped dough strand 100 and in a region of the first intersection point 151. The first dough strand loop 161 formed in this manner (see also FIG. 1A) encompasses holding fork 304, holding pin 305 and table gripper 306, whereby the opening size of the first dough strand loop 161 is determined and fixed. Table gripper 306 is therefore situated within the first dough strand loop 161.

According to FIG. 5, second gripping means 202 is shown in a raised position, rotated 180° from the initial position, so that looping dough strand end 121 is positioned above table gripper 306, or above an opening of the first dough strand loop 161, forming a second dough strand loop 162 (see also FIG. 1C). In this position of dough processing device 1, gripping means 201, 202 are disposed directly adjacent to one another, above the rear section 302a of processing area 302. The required positioning of the securing dough strand end 111 above the second arm 120 is nevertheless enabled by an offset 204 in gripping finger 203 of the first gripping means 201 in the direction of second gripping means 202. In the above-described position of dough strand looping device 1, the dough strand ends 111, 121 are located in a raised position, whereas arcuate section 130 and at least partial sections of the first and second arms 110, 120 continue to rest on processing table 300.

FIGS. 6 and 7 each show dough processing device 1 in a position for discharging or releasing the dough strand ends 111, 121 from gripping means 201, 202. For this purpose, a pushing means, that is to say a plunger 205 and 206, is located between the gripping fingers 203 of each of gripping means 201 and 202, respectively. Plungers 205, 206 are configured for discharging the dough strand ends 111, 121 from the respective gripping means 201, 202 while the gripping fingers 203 are open, for which purpose the plungers 205, 206 execute a vertical pushing movement. Plunger 206 of the second gripping means 202 is located above table gripper 306. Looping dough strand end 121 can be positioned between two shaping fingers 309, 310 of table gripper 306 by means of a vertical sliding movement of plunger 206. In contrast, securing dough strand end 111 can be positioned on the second arm 120 by means of a vertical sliding movement of plunger 205. Holding fork 304 additionally ensures that securing dough strand end 111 is discharged in the desired position, in which dough strand 100 extends between two tines of holding fork 304, arranged along conveying direction F. Plunger 205 additionally exerts pressure on the intersecting dough strand sections in the region of the first intersection point 151, thereby at least loosely fixing the securing dough strand end 111 in place. In this position of dough processing device 1, the shape of dough strand 100 corresponds schematically to that of FIG. 1C.

In FIG. 8, gripping means 201, 202 and plungers 205, 206 are moved vertically upward. Shaping fingers 309, 310 of table gripper 306 for picking up the looping dough strand end 121 are closed, i.e. shaping fingers 309, 310 are located in a position pivoted toward one another, around an axis oriented at a right angle to conveying direction F. A first shaping finger 309 is located downstream of a second opposing shaping finger 310 with respect to conveying direction F. Shaping finger 309 has a shaping edge 309a and a shaping channel 309b, which are suitable for forming a dough nib on one dough strand end 111, 121. While looping dough strand end 121 is picked up by shaping fingers 309, 310 of table gripper 306, dough strand 100 is bent approximately 90° over shaping edge 309a of shaping finger 309, into a shaping channel 309b located below shaping edge 309a. Plastic deformation can be achieved on looping dough strand end 121 as a result of counter pressure exerted by opposing shaping finger 310 on the bent looping dough strand end 121. In principle, the embodiment of a shaping edge 309a and/or a shaping channel 309b is not limited to the shaping fingers 309, 310 of a table gripper 306, and may instead be applied to any gripping means of a processing table 300, in particular to a knotting means 308.

Also in FIG. 8, a knotting means 308 is disposed in processing table 300 at the end of conveyor strip 303 within recess 302b of processing area 302. Knotting means 308 is embodied as movable vertically upward and downward, and can be moved out of or retracted into processing table 300. Two spreading fingers 311 of knotting means 308 are arranged between table gripper 306 and holding fork 304 within the first dough strand loop 161. Spreading fingers 311 can be pivoted around an axis that lies rotated 90° from conveying direction F and can be moved toward one another and away from one another. FIG. 8 shows spreading fingers 311 in a closed position, i.e. moved toward one another. FIG. 9 shows the position of dough processing device 1 that is shown in FIG. 8 from a perspective plan view, for better illustration of shaping edge 309a and shaping channel 309b of shaping finger 309.

A perspective side view according to FIG. 10 shows a lifting means 307, which can be extended out of or retracted into processing table 300 for the purpose of raising a section of dough strand 100, in particular arcuate section 130. In FIG. 10, lifting means 307 is in a position extending obliquely out of processing table 300, the angle between lifting means 307 and processing table 300 deviating, for example, 10°-45° from a perpendicular angle. Lifting means 307 has a channel 307a along its upper edge, for receiving a dough strand section. In the extended position, arcuate section 130 is thus disposed in a position spaced from processing table 300, the distance corresponding to at least the diameter of dough strand 100, so that a dough strand end 111, 121 can be guided through below the raised section.

According to FIG. 11, table gripper 306 can be displaced along conveying direction F and is located in a downstream position with respect to conveying direction F. Lifting means 307 positions arcuate section 130 or a section of the first dough strand loop 161 in a raised position relative to processing table 300, so that table gripper 306 can be moved out of the interior of first dough strand loop 161, below arcuate section 130, in a pulling direction –F, which is oriented opposite conveying direction F. Shaping fingers 309, 310 are located in a position enclosing the looping dough strand end 121, whereby the looping dough strand end 121 is pulled through the first dough strand loop 161 in pulling direction –F, and is thereby stretched. Table gripper 306 exerts a tensile force directed in pulling direction –F on the looping dough strand end 121, thereby tightening or closing the second dough strand loop 162, which is not held open by holding means, around the securing dough strand end 111. At the same time, a third intersection point 153 is formed between first dough strand loop 161 and looping dough strand end 121. In addition, the first dough strand loop 161 is divided into two dough strand sub-loops 161a, 161b by a dough strand section passing through dough strand loop 161. Holding pin 305 is thus disposed within the first dough strand sub-loop 161a, and holding fork 304 and knotting means 308 are disposed within the second dough strand sub-loop 161b. The tensile force exerted by table gripper 306 causes the dough strand sub-loops 161a and 161b to tighten around the respective positioning means 305 and 304, 308. The first gripping means 201 is disposed in a position rotated 180° from the starting or initial position (see FIG. 2) above table gripper 306, in which gripping fingers 203 are open and are offset in conveying direction F by the amount of offset 204. In this position, the shape of dough strand 100 corresponds schematically to that of FIG. 1D.

FIG. 12 shows gripping fingers 203 of first gripping means 201 in a closed position, whereby a section of dough strand 100 above looping dough strand end 121 and downstream of table gripper 306 with respect to conveying direction F is picked up by gripping means 201. Table gripper 306 is in an open position, in order to release looping dough strand end 121. Holding pin 305 is preferably retracted into processing table 300. Lifting means 307 is retracted into processing table 300, so that arcuate section 130 of dough strand 100 is no longer held in a raised position and rests on processing table 300.

Knotting means 308, which is disposed within the second dough strand sub-loop 161b, is in an open position. For this purpose, spreading grippers 311 are pivoted away from one another, each around an axis disposed perpendicular to conveying direction F, so that the distance between the spreading grippers along conveying direction F is increased. By means of spreading grippers 311, the second dough strand sub-loop 161b, which is tightened around knotting means 308, is spread or expanded, utilizing the elasticity of the dough strand. The opening of the second dough strand sub-loop 161b is accordingly enlarged, in order to facilitate guiding of the looping dough strand end 121 through the second dough strand sub-loop 161b.

In FIG. 13, gripping means 201 is in a vertically raised position, whereby looping dough strand end 121 is in a position spaced from processing table 300. While the raised section of dough strand 100 extends substantially parallel and/or obliquely to the processing table, the dough nib, which has been formed on the looping dough strand end 121 by means of shaping fingers 309, 310, points substantially perpendicular in the direction of processing table 300.

In FIG. 14, first gripping means 201 is rotated 180° horizontally with respect to its previous position, so that the closed gripping fingers 203 of gripping means 201 are located above the open spreading fingers 311 of knotting means 308. The downward pointing dough nib can thereby be positioned between spreading fingers 311 of knotting means 308, within the second dough strand sub-loop 161b. A third dough strand loop 163 is thereby created upstream of the first dough strand loop 161 with respect to conveying direction F. In the region of a fourth intersection point 154, a dough strand section located downstream of the looping dough strand end 121 extends above the arcuate section 130 (see also FIG. 1E).

In FIG. 15, plunger 205 of first gripping means 201 is shown in a vertically lowered position, so that the dough nib on the looping dough strand end 121 is held in position between spreading fingers 311 of knotting means 308 by means of plunger 205 until, as shown in FIG. 16, spreading fingers 311 close, thereby picking up the looping dough strand end 121 with the dough nib formed thereon. Gripping fingers 203 of the first gripping means 201 are in a fully open, outward tilted position. Plunger 205 is moved vertically upward from an extended position back into its starting or initial position, which is finally shown in FIG. 17.

In FIG. 18, knotting means 308 is located in a vertically lowered position within processing table 300 with spreading fingers 311 closed, so that looping dough strand end 121 is pulled through second dough strand sub-loop 161b. Holding fork 305 is preferably moved vertically at the same time as knotting means 308 into processing table 300, so that only looping dough strand end 121 remains within the second dough strand sub-loop 161b. Since the diameter of dough strand 100 is smaller than the distance between the open and outward tilted spreading fingers 311 of knotting means 308, and due to the elasticity of dough strand 100, the second dough strand sub-loop 161b tightens around looping dough strand end 121. Looping dough strand end 121 can thereby be secured in a position in which it has passed through the second dough strand sub-loop 161b. Only after the looping dough strand end 121 has been pulled by means of knotting means 308 all the way through the second dough strand sub-loop 161b and/or is located below the surface of processing table 300 do the spreading fingers 311 of knotting means 308 open, thereby releasing the looping dough strand end 121. The secured dough knot preform 140 corresponds schematically to FIG. 1F. Optionally (and not shown), as the looping dough strand end 121 is being pulled through, plunger 205 presses on the fourth intersection point 154 for additional stabilization or fixation of the dough strand knot preform 140.

Once the looping process has been completed, conveyor belts 301 are set in motion in conveying direction F to transport the secured dough strand knot preform 140 to a processing station downstream, preferably a compacting station. Holding forks 304 and holding pin 305 are retracted into processing table 300 at least by the time dough strand knot 140 is transported away. At the same time, an already aligned dough strand 100 with offset dough strand ends 111, 121 is conveyed by conveyor belts 301 and conveyor strip 303 to positioning means 304, 305, 306, 307, 308, and dough processing device 1 is located in its initial or starting position at the beginning of a subsequent looping process, according to FIG. 2.

LIST OF REFERENCE SIGNS 1 dough processing device
100 dough strand
110 first arm
111 securing dough strand end
120 second arm
121 looping dough strand end
130 arcuate section
140 dough strand knot
151 first intersection point
152 second intersection point
153 third intersection point
154 fourth intersection point
161 first dough strand loop
161a first dough strand sub-loop
161b second dough strand sub-loop
162 second dough strand loop
163 third dough strand loop
D distance between the dough strand ends
F conveying direction
−F pulling direction
200 processing head
201 first gripping means
202 second gripping means
203 gripping finger
204 offset
205 plunger of the first gripping means
206 plunger of the second gripping means
300 processing table
301 conveyor belt
302 processing area
302a rear section of the processing area
302b recess
303 conveyor strip
304 holding fork
305 holding pin
306 table gripper
307 lifting means
307a channel
308 knotting means
309 shaping finger
309a shaping edge
309b shaping channel
310 opposing shaping finger
311 spreading finger

The invention claimed is:

1. A dough processing device for processing a U-shaped dough strand which has a first dough strand end and a second dough strand end, the dough processing device comprising a processing head and a processing table, wherein the processing head comprises at least two grippers for looping at least one dough strand loop, the processing table is equipped with multiple positioning means for positioning the dough strand, and the multiple positioning means have a plurality of different processing functions, wherein
　(a) at least a first positioning means of the multiple positioning means is embodied as a lifting means for raising a dough strand section to a raised position relative to the processing table,
　(b) at least a second positioning means of the multiple positioning means is embodied as a table gripper for pulling one of the dough strand ends to stretch or pull at least regions of the dough strand, and
　(c) at least a third positioning means of the multiple positioning means is embodied as a knotting means attached to the processing table and configured for spreading or expanding an opening of a dough strand loop of the at least one dough strand loop and for guiding the one dough strand end through the dough strand loop and for pulling the one dough strand end through the previously expanded opening of the dough strand loop so that the one dough strand end is securable in place after passing through the dough strand loop, wherein the knotting means is locatable in a vertically lowered position into the processing table and is movable vertically upward and downward.

2. The dough processing device according to claim 1, wherein the knotting means has at least two fingers, which are embodied as projecting out of the processing table and as movable toward one another and away from one another.

3. The dough processing device according to claim 2, wherein the knotting means is embodied as a spreading gripper having at least two spreading fingers, the spreading fingers being movable toward one another and away from one another, and the knotting means being retractable into the processing table and extendable out of the processing table.

4. The dough processing device according to claim 3, wherein the table gripper is configured to be opened and closed in order to pull the one dough strand end in a pulling direction or parallel to the pulling direction.

5. The dough processing device according to claim 4, wherein the table gripper has a shaping edge or a shaping channel for shaping a dough strand nib on the one dough strand end.

6. The dough processing device according to claim 5, wherein the dough processing device comprises a compacting station for compacting a dough strand knot or for exerting pressure on both sides of the dough strand knot.

7. The dough processing device according to claim 6, in which the at least two grippers of the processing head each comprise a plunger and two gripping fingers, wherein the plunger is disposed between the gripping fingers or in a same plane as the gripping fingers.

8. The dough processing device according to claim 7, in which the processing table has a plurality of mutually adjacent conveyor belts arranged substantially parallel to one another for conveying the dough strand, and at least some of the multiple positioning means are disposed between respectively adjacent conveyer belts, wherein at least one of the multiple positioning means is embodied as a conveyor strip for positioning a section of the dough strand on at least one other positioning means of the multiple positioning means, the conveyor strip ending or beginning at the at least one other positioning means, or the at least one other positioning means being disposed at an end or at a beginning of the conveyor strip.

9. A dough processing device for processing a U-shaped dough strand which has a first dough strand end and a second dough strand end, the dough processing device comprising a processing head and a processing table, wherein the processing head comprises at least two gripping means that each include two gripping fingers for looping at least one dough strand loop, the processing table is equipped with positioning means for positioning the dough strand, and the positioning means, that the processing table is equipped with, have a plurality of different processing functions, wherein the positioning means include:
  (a) lifting means including a member that is movable upwardly for raising a dough strand section to a raised position relative to the processing table;
  (b) a table gripper including shaping fingers for pulling one of the dough strand ends to stretch or pull at least regions of the dough strand; and
  (c) a knotting means attached to the processing table and including two spreading fingers, wherein the knotting means is configured for spreading or expanding an opening of a dough strand loop of the at least one dough strand loop and for guiding the one dough strand end through the dough strand loop and for pulling the one dough strand end through the previously expanded opening of the dough strand loop so that the one dough strand end is securable in place after passing through the dough strand loop, wherein the knotting means is locatable in a vertically lowered position into the processing table and is movable vertically upward and downward.

10. The dough processing device according to claim 9, wherein the spreading fingers of the knotting means are movable away from one another to expand the opening of the dough strand loop, and toward one another to grip the one dough strand end, and wherein the knotting means is movable from a raised knotting means position to the lowered position with the spreading fingers moved toward one another to pull the one dough strand end through the previously expanded opening of the dough strand loop.

\* \* \* \* \*

UNITED STATES PATENT AND TRADEMARK OFFICE
CERTIFICATE OF CORRECTION

PATENT NO. : 11,006,635 B2
APPLICATION NO. : 15/259718
DATED : May 18, 2021
INVENTOR(S) : Udo Bernhardt Page 1 of 1

It is certified that error appears in the above-identified patent and that said Letters Patent is hereby corrected as shown below:

In the Claims

Column 15, Line 7, Claim 3:
After "The dough processing device according to"
Delete "claim 2" and
Insert -- claim 1 --.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*